(12) United States Patent
Wakabayashi

(10) Patent No.: US 9,857,622 B2
(45) Date of Patent: Jan. 2, 2018

(54) MICROLENS ARRAY SUBSTRATE, ELECTRO-OPTICAL DEVICE, AND ELECTRONIC APPARATUS

(71) Applicant: Seiko Epson Corporation, Tokyo (JP)

(72) Inventor: Junichi Wakabayashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 57 days.

(21) Appl. No.: 14/746,363

(22) Filed: Jun. 22, 2015

(65) Prior Publication Data

US 2016/0004120 A1    Jan. 7, 2016

(30) Foreign Application Priority Data

Jul. 4, 2014   (JP) ................. 2014-138393

(51) Int. Cl.
    *G02F 1/1335*    (2006.01)
    *G02B 3/00*      (2006.01)
    *G02B 19/00*     (2006.01)
    *G02F 1/1333*    (2006.01)

(52) U.S. Cl.
    CPC ..... *G02F 1/133526* (2013.01); *G02B 3/0012* (2013.01); *G02B 3/0056* (2013.01); *G02B 19/0014* (2013.01); *G02F 2001/133302* (2013.01)

(58) Field of Classification Search
    CPC .................................... G02F 1/133526
    See application file for complete search history.

(56) References Cited

U.S. PATENT DOCUMENTS

| | | | |
|---|---|---|---|
| 6,825,889 B1* | 11/2004 | Saito | G02F 1/133526 349/5 |
| 2003/0228759 A1 | 12/2003 | Uehara et al. | |
| 2006/0046486 A1 | 3/2006 | Ozawa | |
| 2006/0195293 A1 | 8/2006 | Koike et al. | |
| 2007/0183016 A1* | 8/2007 | Kamijima | H04N 9/3102 359/245 |
| 2007/0216827 A1* | 9/2007 | Okada | G02B 3/0031 349/62 |
| 2009/0257000 A1 | 10/2009 | Ogasawara et al. | |
| 2010/0283941 A1* | 11/2010 | Nemoto | B29D 11/00298 349/63 |

FOREIGN PATENT DOCUMENTS

| | | |
|---|---|---|
| JP | 2000-028805 A | 1/2000 |
| JP | 2004-004745 A | 1/2004 |
| JP | 2004-361821 A | 12/2004 |
| JP | 2006-039263 A | 2/2006 |

(Continued)

*Primary Examiner* — Kendrick Hsu
(74) *Attorney, Agent, or Firm* — ALG Intellectual Property, LLC

(57) ABSTRACT

A microlens array substrate includes a substrate having a surface in which a concave portion is provided, a lens layer that is provided so as to fill the concave portion, and an optical path length adjustment layer that is provided so as to cover the lens layer. A flat portion is disposed in a central portion of the concave portion. A refractive index of the lens layer is higher than a refractive index of the substrate, and a refractive index of the optical path length adjustment layer is higher than a refractive index of the substrate and is equal to or lower than a refractive index of the lens layer.

10 Claims, 11 Drawing Sheets

(56) References Cited

FOREIGN PATENT DOCUMENTS

| | | | |
|---|---|---|---|
| JP | 2006-071941 | A | 3/2006 |
| JP | 2006-235415 | A | 9/2006 |
| JP | 2007-101833 | A | 4/2007 |
| JP | 2007-248494 | A | 9/2007 |
| JP | 4285373 | B | 6/2009 |
| JP | 2009-258298 | | 11/2009 |
| JP | 2010-181791 | A | 8/2010 |
| JP | 4518179 | B | 8/2010 |
| JP | 2012-226069 | A | 11/2012 |
| JP | 2014-092601 | A | 5/2014 |

* cited by examiner

MICROLENS ARRAY SUBSTRATE, ELECTRO-OPTICAL DEVICE, AND ELECTRONIC APPARATUS

BACKGROUND

1. Technical Field

The present invention relates to a microlens array substrate, an electro-optical device, and an electronic apparatus.

2. Related Art

An electro-optical device is known which includes an electro-optical material (for example, liquid crystal or the like) positioned between an element substrate and a counter substrate. As the electro-optical device, for example, a liquid crystal device or the like that is used as a liquid crystal light valve of a projector can be used. It is necessary to achieve high light utilization efficiency in the liquid crystal device. Therefore, a configuration is known in which a microlens array substrate is included in the liquid crystal device, the light that is blocked by a light blocking layer, among the light incident on the liquid crystal device, is focused by a microlens, the focused light is incident on an inside of an opening of a pixel, and thereby an actual opening rate of a liquid crystal is increased (for example, refer to JP-A-2004-4745).

The microlens array substrate described in JP-A-2004-4745 is formed by coating a concave portion (dent) of a substrate with a lens layer formed using a high refraction adhesive and by bonding the substrate to a glass plate for adjustment. When the concave portion is formed in the substrate, an undesired material accumulated in the concave portion covers a substrate surface and circulation of an etching solution is inhibited, and thereby the central portion of the concave portion becomes an approximately flat shape. Since a focusing action in the portion of an approximately flat shape is not performed, parallel light that is incident on the central portion of the microlens is not refracted, travels in a straight line as it is, and is emitted from the microlens.

However, the light that is incident on the microlens array substrate includes not only parallel light in the normal direction to the substrate surface, but also considerable amount of inclined light having an angle with respect to the normal direction. In the microlens array substrate described in JP-A-2004-4745, a refractive index of the lens layer is higher than that of a refractive index of the substrate, and a refractive index of the glass plate for adjustment is equal to the refractive index of the substrate. For this reason, the inclined light that is incident on the central portion of the microlens is refracted at an interface between the substrate and the lens layer, and the refraction angle thereof becomes smaller than the incident angle, but the light is refracted again at the interface between the lens layer and the glass plate for adjustment, is returned to an angle at the time of being incident on the microlens and is emitted. For this reason, there is a possibility that the inclined light emitted from the microlens may be blocked by the light blocking portion and thereby utilization efficiency of light may be decreased, or that the light obliquely proceeding with respect to an orientation of liquid crystal molecules is increased and thus a contrast ratio is decreased.

SUMMARY

The invention can be realized by the following aspects or application examples.

Application Example 1

According to this application example, there is provided a microlens array substrate including: a substrate having a first surface in which a concave portion is provided; a lens layer that is provided so as to fill the concave portion; and a light passing-through layer that is provided so as to cover the lens layer, in which a flat portion is disposed in a central portion of the concave portion, and in which a refractive index of the lens layer is higher than a refractive index of the substrate, and a refractive index of the light passing-through layer is higher than a refractive index of the substrate and is equal to or lower than a refractive index of the lens layer.

According to the configuration of the application example, by filling the concave portion with the lens layer with a refractive index higher than the refractive index of the substrate, the microlens is configured. Since the concave portion has the flat portion with no light focusing action in the central portion, parallel light incident on the central portion of the microlens passes through the lens layer and the light passing-through layer without refraction. Meanwhile, since the refractive index of the lens layer is higher than the refractive index of the substrate, the inclined light incident on the central portion of the microlens is refracted at an interface between the substrate and the lens layer and a refraction angle thereof is smaller than the incident angle. Here, since a refractive index of the light passing-through layer is higher than the refractive index of the substrate and is equal to or lower than the refractive index of the lens layer, the refraction angle at the time of light being refracted at the interface between the lens layer and the light passing-through layer is lower than the incident angle when the inclined light is incident on the lens layer. Thus, it is possible to emit the inclined light incident on the central portion of the microlens at a small angle with respect to the normal direction, compared to when the refractive index of the light passing-through layer is the same as the refractive index of the substrate. In addition, since a difference between the refractive index of the lens layer and the refractive index of the light passing-through layer is small, reflection of the inclined light at the interface between the lens layer and the light passing-through layer is suppressed. Accordingly, it is possible to increase utilization efficiency of light.

Application Example 2

In the microlens array substrate according to the application example, the refractive index of the light passing-through layer may be lower than the refractive index of the lens layer.

According to the configuration of the application example, the refractive index of the light passing-through layer is lower than the refractive index of the lens layer. That is, since the refractive index of the light passing-through layer differs from the refractive index of the lens layer, it is possible to form a layer in a separate step, using materials with composition ratios or mixing ratios that are different from each other in the light passing-through layer and the lens layer.

Application Example 3

In the microlens array substrate according to the application example, it is preferable that the concave portion has an inclined surface that is inclined toward the flat portion from the first surface in a rim portion.

According to the configuration of the application example, the rim portion of the concave portion has the inclined surface which is inclined toward the flat portion from the first surface of the substrate, that is, a surface of a tapered shape. Thus, it is possible to suppress an excessive refraction of the light that is incident on the rim portion, compared to when the rim portion of the concave portion is curved. In addition, since an angle at which the light incident on the rim portion is refracted is approximately uniform, it is possible to decrease variation of an angle at which the light is emitted from the microlens.

Application Example 4

According to this application example, there is provided an electro-optical device including: a first substrate; a second substrate that is disposed so as to face the first substrate; an electro-optical layer that is disposed between the first substrate and the second substrate; and a light blocking portion that is configured by a plurality of light blocking layers which is disposed in the first substrate, and has an opening corresponding to a pixel, in which the first substrate or the second substrate includes the microlens array substrate according to any one of Application Examples 1 to 3, and in which an inner edge of the light blocking portion is disposed further outside than an outer edge of the flat portion, in a planar view.

According to the configuration of the application example, the electro-optical device includes the light blocking portion that is configured by a plurality of light blocking layers and has an opening corresponding to each pixel, and the microlens array substrate. For this reason, the inclined light incident on the central portion (flat portion) of the microlens is emitted at a small angle with respect to the normal direction, and thus when travelling at the incident angle at the time of being incident as it is, the inclined light that is blocked by the light blocking portion can be led to the inside of the opening of each pixel. In addition, since the inner edge of the light blocking portion is disposed further outside than the outer edge of the flat portion, the parallel light that is incident on the central portion of the microlens and is emitted without being refracted, passes through the inside of the opening without being blocked by the light blocking portion. Accordingly, it is possible to suppress a decrease of utilization efficiency of light due to the parallel light and the inclined light which are incident on the electro-optical device being blocked by the light blocking portion, or to suppress a decrease of the contrast ratio due to the light which obliquely proceeds with respect to an orientation of liquid crystal molecules being increased.

Application Example 5

In the electro-optical device according to the application example, it is preferable that the pixel has an approximately rectangular shape in a planar view, and the lens layer is continuously provided toward a direction of a diagonal line that connects opposite corners of the pixel to each other.

According to the configuration of the application example, the lens layer is continuously provided in the direction of the diagonal line that connects the opposite corners of the pixel. In other words, the lens layer is provided in not only a portion that fills the concave portion but also a surface of the substrate between the concave portions adjacent to each other in the diagonal line direction of the pixel. For this reason, in a step of grinding a surface of the lens layer that is formed so as to fill the concave portion and then planarizing the surface, the grinding is completed in a state where the lens layer remains between the concave portions adjacent to each other in the diagonal line direction of the pixel, and thus it is possible to suppress a decrease of utilization efficiency of light due to a small lens diameter caused by excessive grinding of the lens layer.

Application Example 6

According to this application example, there is provided an electronic apparatus including the electro-optical device according to the above application examples.

According to the configuration of the application example, it is possible to provide an electronic apparatus that displays a bright image with an excellent contrast ratio.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, specific embodiments according to the invention will be described with reference to the drawings. Figures to be used are appropriately illustrated in an enlarged, reduced, or exaggerated manner, such that a portion to be described is in a recognizable state. In addition, there is a case in which configuration elements other than those necessary for description are not illustrated.

In the following forms, in a case in which, for example, "on a substrate" is described, it indicates a case in which a member is disposed on the substrate so as to be in contact with the substrate, a case in which the member is disposed over the substrate via other configuration material, or a case in which a portion of the member is disposed on the substrate such that the portion thereof is in contact with the substrate, and another portion is disposed via another configuration material.

First Embodiment

Electro-Optical Device

Herein, as an electro-optical device, an active matrix type liquid crystal device in which a thin film transistor (TFT) is included as a switching element of a pixel, is used as an example. The liquid crystal device can be appropriately used as, for example, a light modulation element (liquid crystal light valve) of a projection display device (projector) that will be described later.

Figure 1:
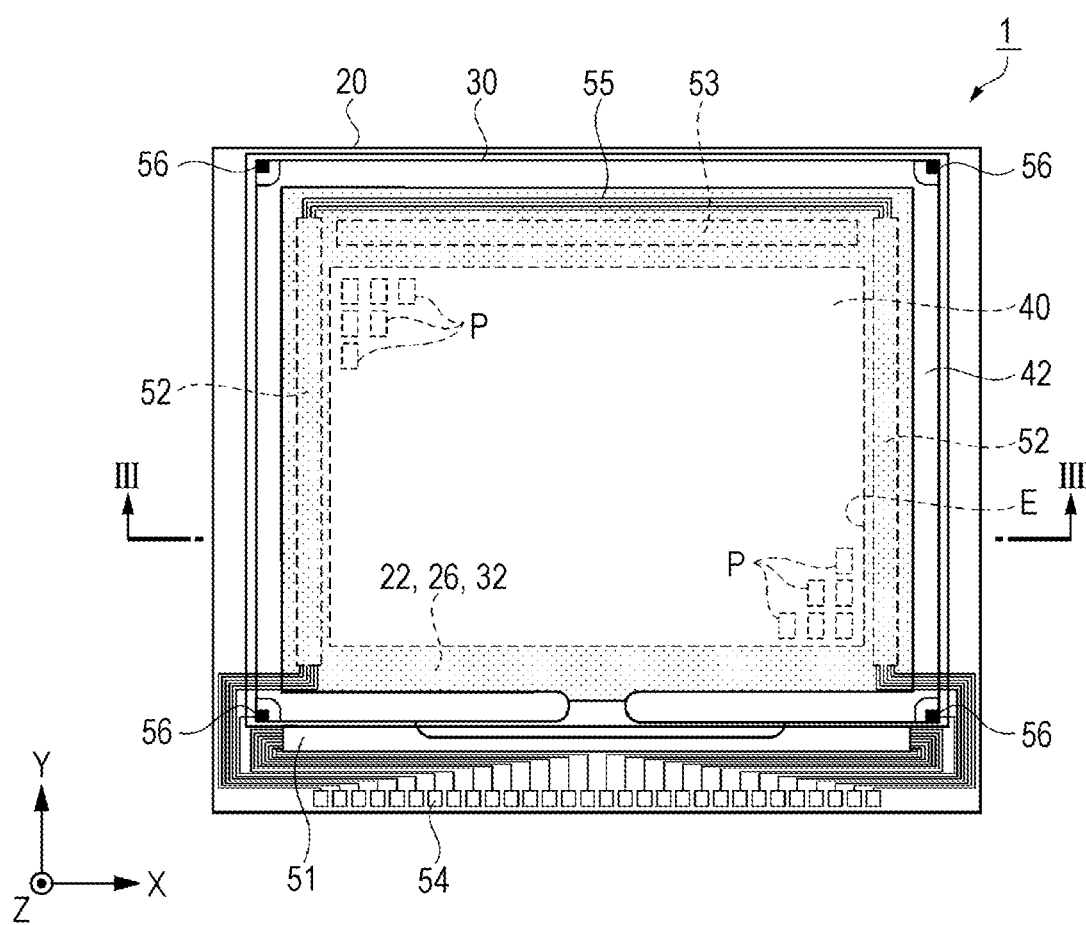
FIG. 1 is a schematic plan view illustrating a configuration of a liquid crystal device according to a first embodiment.
Figure 2:
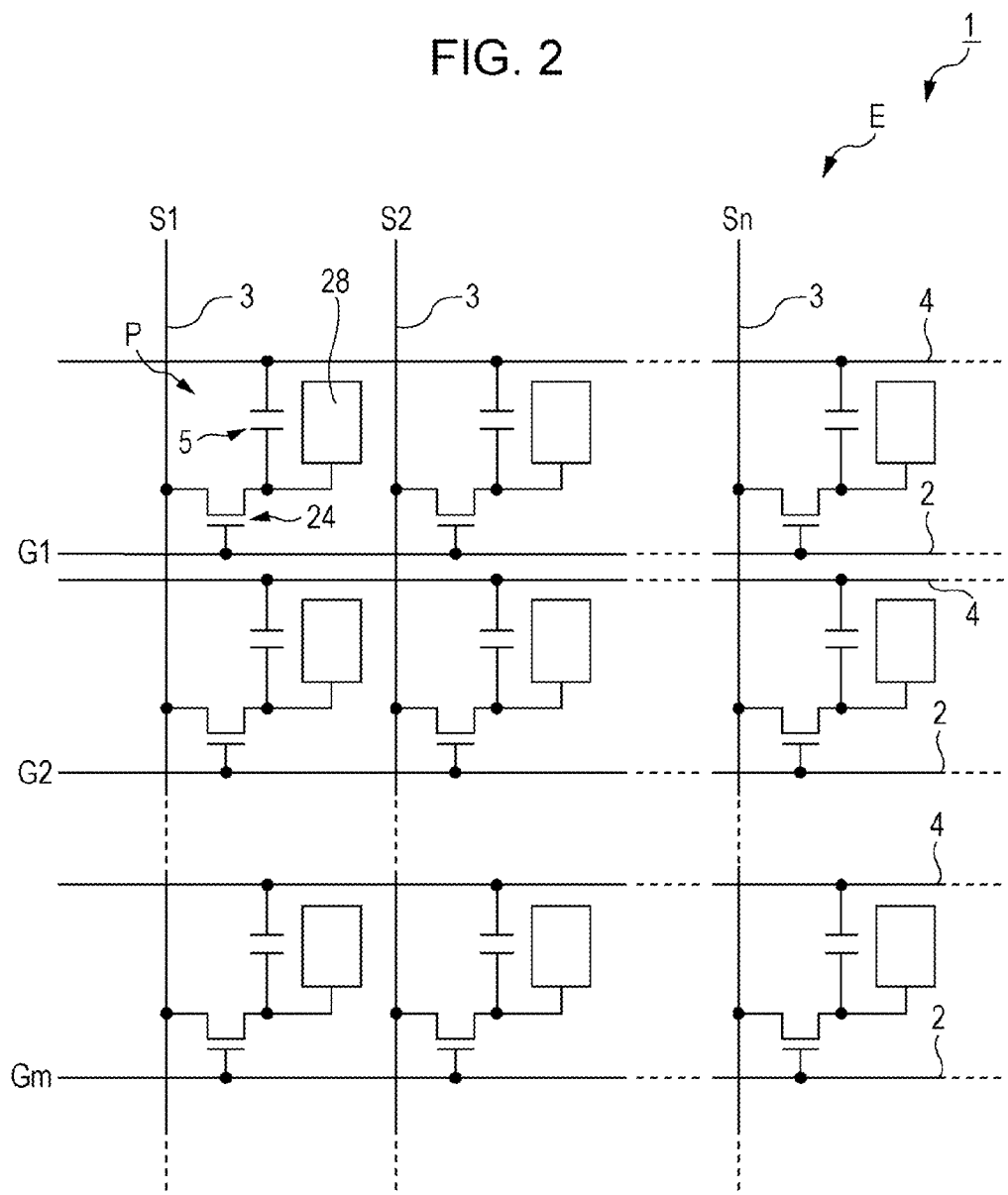
FIG. 2 is an equivalent circuit diagram illustrating an electrical configuration of the liquid crystal device according to the first embodiment.
Figure 3:
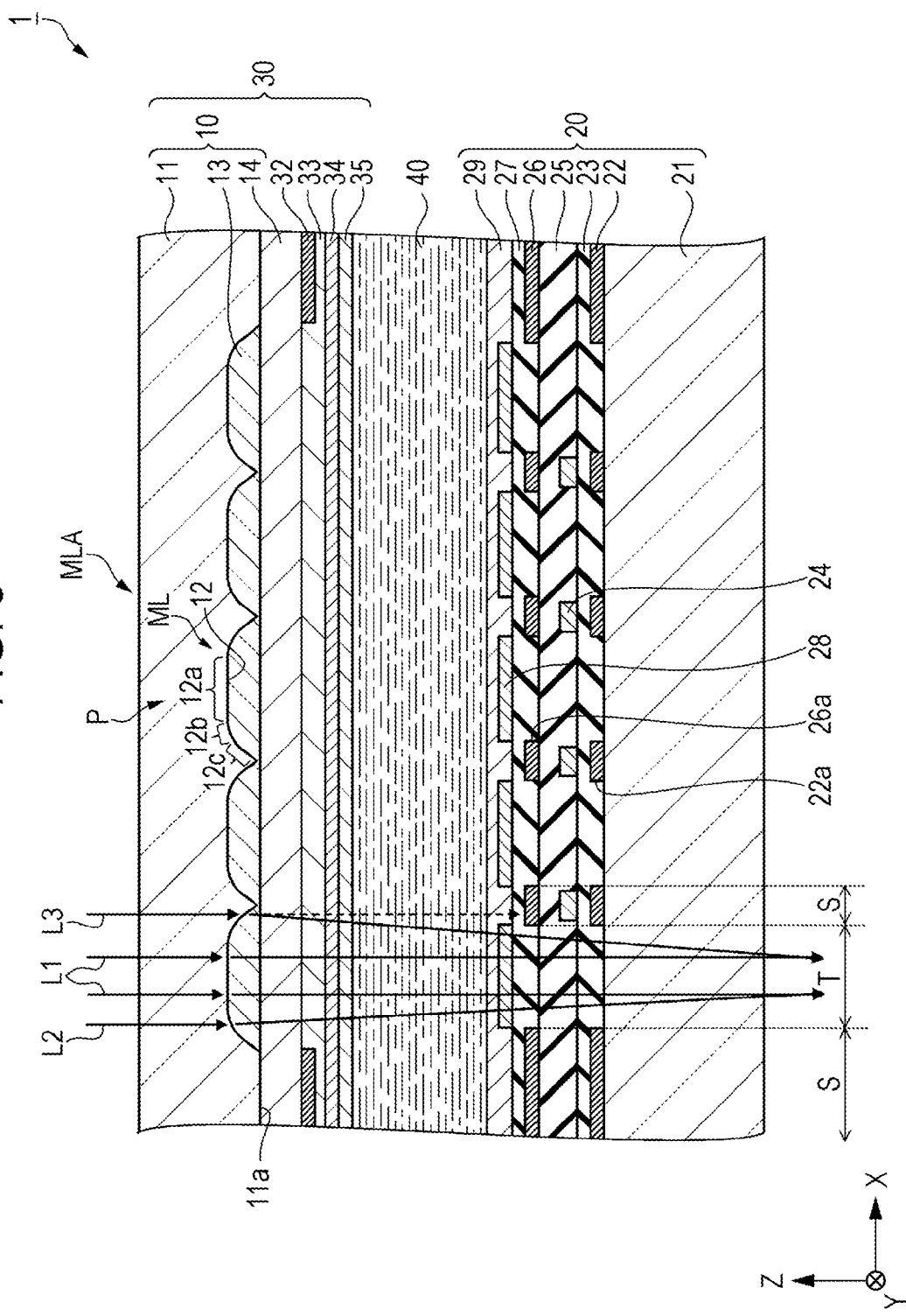
FIG. 3 is a schematic cross-sectional view illustrating the configuration of the liquid crystal device according to the first embodiment.

To begin with, a liquid crystal device which functions as an electro-optical device according to a first embodiment will be described with reference to FIG. 1, FIG. 2, and FIG. 3. FIG. 1 is a schematic plan view illustrating a configuration of a liquid crystal device according to the first embodiment. FIG. 2 is an equivalent circuit diagram illustrating an electrical configuration of the liquid crystal device according to the first embodiment. FIG. 3 is a schematic cross-sectional view illustrating a configuration of the liquid crystal device according to the first embodiment. Specifically, FIG. 3 is a schematic cross-sectional view which is cut along a line III-III of FIG. 1.

As illustrated in FIG. 1 and FIG. 3, a liquid crystal device 1 according to the first embodiment includes an element substrate 20 as a first substrate, a counter substrate 30 as a second substrate that is disposed in a side opposite to the element substrate 20, a sealing material 42, and a liquid crystal layer 40 as an electro-optical layer. As illustrated in FIG. 1, the element substrate 20 is larger than the counter substrate 30, and both substrates are bonded together via the sealing material 42 that is disposed in a frame shape along edges of the counter substrate 30.

The liquid crystal layer 40 is configured by a liquid crystal with a positive or negative dielectric anisotropy that is inserted in a space which is surrounded by the element substrate 20, the counter substrate 30, and the sealing material 42. The sealing material 42 is formed of an adhesive such as an epoxy resin with, for example, a thermosetting property or an ultraviolet curable property. In the sealing material 42, spacers (not illustrated) for retaining a constant interval between the element substrate 20 and the counter substrate 30 are mixed in.

In the inside of the sealing material 42 that is disposed in a frame shape, light blocking layers 22 and 26 that are provided in the element substrate 20, and a light blocking layer 32 that is provided in the counter substrate 30 are disposed. The light blocking layers 22, 26, and 32 have rim portions of a frame shape, and formed of a metal with a light blocking property, a metal oxide, or the like. The insides of the light blocking layers 22, 26, and 32 of a frame shape are formed as a display area E in which a plurality of pixels P is disposed. The pixels P respectively have, for example, an approximately rectangular shape, and are disposed in a matrix.

The display area E is an area that contributes to an actual display in the liquid crystal device 1. The light blocking layers 22 and 26 that are provided in the element substrate 20 are provided in, for example, a lattice pattern in the display area E, such that a plurality of pixels P are partitioned in a flat manner. The liquid crystal device 1 may include a dummy area that is provided so as to surround the periphery of the display area E and does not contribute to an actual display.

On a side opposite to the display area E of the sealing material 42 that is formed along a first side of the element substrate 20, a data line drive circuit 51 and a plurality of outside connection terminals 54 are provided along the first side. In addition, on the display area E side of the sealing material 42 along a second side opposite to the first side, a test circuit 53 is provided. Furthermore, in the inside of the sealing material 42 along other two sides that are orthogonal to the two sides and face each other, a scan line drive circuit 52 is provided.

On the display area E side of the sealing material 42 of the second side in which the test circuit 53 is provided, a plurality of wires 55 that are connected to two scan line drive circuits 52 is provided. The wires that are connected to the data line drive circuit 51 and the scan line drive circuit 52 are connected to the plurality of outside connection terminals 54. In addition, on the corners of the counter substrate 30, upper and lower conduction portions 56 for electrically connecting between the element substrate 20 and the counter substrate 30 are provided. The disposition of the test circuit 53 is not limited to this, and may be provided in a position along the inside of the sealing material 42 between the data line drive circuit 51 and the display area E.

In the following description, a direction along the first side in which the data line drive circuit 51 is provided is referred to as an X direction, and a direction along the other two sides that are orthogonal to the first side and face each other is referred to as a Y direction. The X direction is a direction along a line III-III (VIII-VIII) of FIG. 1. The light blocking layers 22 and 26 are provided in the X direction and the Y direction in a lattice pattern. The pixels P are partitioned in a lattice pattern by the light blocking layers 22 and 26, and are arranged in the X direction and the Y direction in a matrix.

In addition, a direction that is orthogonal to the X direction and the Y direction, and is upward in FIG. 1 is referred to as Z direction. In the present specification, viewing from a normal direction (Z direction) to a surface on the counter substrate 30 side of the liquid crystal device 1 is referred to as a "planar view".

As illustrated in FIG. 2, scan lines 2 and data lines 3 are formed so as to intersect each other in the display area E, and the pixel P is provided in correspondence to an intersecting point of the scan line 2 and the data line 3. A pixel electrode 28 and a TFT 24 which functions as a switching element are provided in each pixel P.

A source electrode (not illustrated) of the TFT 24 is electrically connected to the data line 3 extending from the data line drive circuit 51. Image signals (data signals) S1, S2, . . . , Sn are sequentially supplied from the data line drive circuit 51 (refer to FIG. 1) to the data line 3. A gate electrode (not illustrated) of the TFT 24 is a portion of the scan line 2 extending from the scan line drive circuit 52. Scan signals G1, G2, . . . , Gn are sequentially supplied from the scan line drive circuit 52 to the scan line 2. A drain electrode (not illustrated) of the TFT 24 is electrically connected to the pixel electrode 28.

When the TFT 24 is in an ON state for a predetermined period of time only, the image signals S1, S2, . . . , Sn are written to the pixel electrode 28 via the data line 3 at a predetermined timing. By doing this, the image signal with a predetermined level that is written to the liquid crystal layer 40 via the pixel electrode 28 is retained in a liquid crystal capacitor formed between common electrode 34 and the liquid crystal layer 40 (refer to FIG. 3) provided in the counter substrate 30, for a predetermined period of time.

In order to prevent the retained image signals S1, S2, . . . , Sn from leaking, a storage capacitor 5 is formed between the capacitance line 4 formed along the scan line 2, and the pixel electrode 28, and disposed in parallel to liquid crystal capacitors. In this way, if voltage signal is applied to a liquid crystal of each pixel P, an orientation state of the liquid crystal is changed by the applied voltage level. Accordingly, light incident to the liquid crystal layer 40 (refer to FIG. 3) is modulated and a gradation display can be performed.

When orientation or order of molecular aggregates is changed by the applied voltage level, the liquid crystal that configures the liquid crystal layer 40 modulates light, and performs the gradation display. For example, in a case of a normally white mode, transmissivity of an incident light is decreased according to a voltage applied by a unit of each pixel P. In a case of a normally black mode, the transmissivity of an incident light is increased according to the voltage applied by a unit of each pixel P, and as a whole, light with a contrast ratio according to the image signal is emitted from the liquid crystal device 1.

As illustrated in FIG. 3, the counter substrate 30 includes a microlens array substrate 10 the light blocking layer 32, a protection layer 33, the common electrode 34, and a orientation film 35 according to the first embodiment.

The microlens array substrate 10 includes a substrate 11, a lens layer 13, and an optical path length adjustment layer 14 which functions as a light passing-through layer. The substrate 11 is formed of an inorganic material with optical transmissivity such as glass or quartz. A surface on the liquid crystal layer 40 side of the substrate 11 is referred to as a surface 11a as a first surface. The substrate 11 includes a plurality of concave portions 12 that is formed in the surface 11a. Each concave portion 12 is provided in correspondence to the pixels P. The concave portion 12 has a flat portion 12a that is disposed in a central portion of the concave portion, an inclined surface 12c that is disposed in a rim portion, and a curved surface portion 12b that is disposed between the flat portion 12a and the inclined surface 12c.

The lens layer 13 is formed so as to fill the plurality of concave portions 12. The lens layer 13 is formed of an inorganic material with optical transmissivity and an optical refractive index higher than that of the substrate 11. As the inorganic material, for example SiON, $Al_2O_3$, or the like is used. By filling the concave portion 12 with a material that forms the lens layer 13, a microlens ML of a convex shape is configured. Each microlens ML is provided in correspondence to the pixels P. In addition, the microlens array MLA is configured by a plurality of microlenses ML.

The optical path length adjustment layer 14 is provided so as to cover the substrate 11 and the lens layer 13. The optical path length adjustment layer 14 is formed of an inorganic material with optical transmissivity and an optical refractive index higher than that of the substrate 11 and lower than that of the lens layer 13. For example, the optical path length adjustment layer 14 is configured by the same inorganic material as the lens layer 13.

When the lens layer 13 and the optical path length adjustment layer 14 are formed with SiON, and a ratio of nitride (N) to oxygen (O) is different in the lens layer 13 from in the optical path length adjustment layer 14, it is possible to make an optical refractive index of the lens layer 13 differ from an optical refractive index of the optical path length adjustment layer 14. More specifically, by increasing the ratio of the nitride (N) to the oxygen (O) that are included in the SiON, it is possible to increase the optical refractive index. For example, if the optical refractive index of the substrate 11 is 1.46, the optical refractive index of the lens layer 13 is approximately 1.56 to 1.70, the optical refractive index of the optical path length adjustment layer 14 is approximately 1.48 to 1.69.

The optical path length adjustment layer 14 has a function to adjust a distance between the microlens ML and the light blocking layer 26 to a desired value. Thus, a layer thickness of the optical path length adjustment layer 14 is approximately set based on an optical condition such as a focus distance of the microlens ML according to a wavelength of light.

The light blocking layer 32 is provided on the microlens array substrate 10 (optical path length adjustment layer 14). The light blocking layer 32 is provided so as to surround a periphery of a display area E (refer to FIG. 1) in which the microlenses ML are disposed. The light blocking layer 32 may be provided within the display area E, and may be formed in a lattice pattern, an island shape, a stripe shape, or the like, so as to overlap the light blocking layer 22 and the light blocking layer 26 of the element substrate 20 in a planar view.

The protection layer 33 is provided so as to cover the optical path length adjustment layer 14 and the light blocking layer 32. The common electrode 34 is provided so as to cover the protection layer 33. The common electrode 34 is formed across the plurality of pixels P. The common electrode 34 is formed of a transparent conductive film, of such as an indium tin oxide (ITO) or indium zinc oxide (IZO). The orientation film 35 is provided so as to cover the common electrode 34.

The protection layer 33 covers the light blocking layer 32 such that a surface of the liquid crystal layer 40 side of the common electrode 34 is flat, and is not an essential configuration element. For example, the common electrode 34 may be formed so as to directly cover the light blocking layer 32 with conductivity.

The element substrate 20 includes a substrate 21, the light blocking layer 22, an insulating layer 23, the TFT 24, an insulating layer 25, the light blocking layer 26, an insulating layer 27, the pixel electrode 28, and an orientation film 29. The substrate 21 is formed of a material with optical transmissivity such as glass or quartz.

The light blocking layer 22 is provided on the substrate 21. The light blocking layer 22 is formed of a lattice pattern so as to overlap to light blocking layer 26 of a layer above in a planar view. The light blocking layer 22 and the light blocking layer 26 are disposed so as to interpose the TFTs 24 therebetween in a thickness direction (Z direction) of the element substrate 20. The light blocking layer 22 overlaps at least a channel region of the TFT 24 in a planar view.

By providing the light blocking layer 22 and the light blocking layer 26, the light that is incident on the TFT 24 is suppressed, and thus it is possible to suppress an increase of an optical leakage current in the TFT 24, or to suppress malfunctioning caused by the light. Light blocking portion S is configured by the light blocking layer 22 and the light blocking layer 26. An area surrounded by the light blocking layer 22 (in an inside of opening 22a) and an area surrounded by the light blocking layer 26 (in an inside of opening 26a) overlap each other in a planar view, and become openings T through which light passes, among areas of the pixels P.

The insulating layer 23 is provided so as to cover the substrate 21 and the light blocking layer 22. The insulating layer 23 is formed of an inorganic material such as $SiO_2$.

The TFT 24 is provided on the insulating layer 23. The TFT 24 is a switching element for driving the pixel electrode 28. The TFT 24 is configured with a semiconductor layer which is not illustrated, a gate electrode, a source electrode, and a drain electrode. A source region, a channel region, and a drain region are formed in the semiconductor layer. A lightly doped drain (LDD) area may be formed in an interface between the channel region and the source region, or between the channel region and the drain region.

The gate electrode is formed in an area that overlaps the channel region of the semiconductor layer in the element substrate 20 in a planar view, via a portion (gate insulating film) of the insulating layer 25. While not being illustrated, the gate electrode is electrically connected to a scanning line disposed on a lower layer side via a contact hole, and performs an on/off control of the TFT 24 according to a scanning signal that is applied.

The insulating layer 25 is provided so as to cover the insulating layer 23 and the TFT 24. The insulating layer 25 is formed of an inorganic material such as $SiO_2$. The insulating layer 25 includes a gate insulating film that insulates between the semiconductor layer and the gate electrode of the TFT 24. By the insulating layer 25, roughness of a surface caused by the TFT 24 is reduced. The light blocking layer 26 is provided on the insulating layer 25. Then, the insulating layer 27 formed of an inorganic material is provided so as to cover the insulating layer 25 and the light blocking layer 26.

The pixel electrode 28 is provided on the insulating layer 27 in correspondence to the pixel P. The pixel electrode 28 is disposed in an area that overlaps an opening 22a of the light blocking layer 22 and an opening 26a of the light blocking layer 26 in a planar view. The pixel electrode 28 is formed of a transparent conductive film, of such as an indium tin oxide (ITO) or indium zinc oxide (IZO). The orientation film 29 is provided so as to cover the pixel electrode 28. The liquid crystal layer 40 is inserted between the orientation film 29 on the element substrate 20 and the orientation film 35 on the counter substrate 30.

The TFT 24, and an electrode, a wire, or the like (not illustrated) that supplies an electric signal to the TFT 24 are provided in an area that overlaps the light blocking layer 22 and the light blocking layer 26 in a planar view. The electrode, the wire, or the like may be configured to serve as the light blocking layer 22 and the light blocking layer 26.

In the liquid crystal device 1 according to the first embodiment, for example, the light that is emitted from a light source or the like is incident from the counter substrate 30 (substrate 11) including the microlens ML. Among the lights that are incident, light L1 of parallel light that is incident on the central portion (flat portion 12a) of the microlens ML in a normal direction to the surface of the counter substrate 30 (substrate 11), travels in a straight line as it is because the flat portion 12a does not have a light focusing function, passes through the inside of the opening T of the pixel P, and is emitted toward the element substrate 20.

Hereinafter, the normal direction to the surface of the counter substrate 30 (substrate 11) is simply referred to as the "normal direction". The "normal direction" is a direction in the Z direction of FIG. 3, and is approximately the same direction as the normal direction to the element substrate 20 (substrate 21). In addition, the light that is parallel to the normal direction is referred to as "parallel light", and the light that is inclined (having an angle) with respect to the normal direction is referred to as "inclined light".

Light L2 of parallel light that is incident on the curved surface portion 12b from an outside of the flat portion 12a of the microlens ML is refracted toward a planar center of the pixel P by a difference of optical refractive index between the substrate 11 and the lens layer 13, passes through the inside of the opening T of the pixel P, and is emitted toward the element substrate 20 side. Even when the curved surface portion 12b is disposed in an area that overlaps the light blocking portion S (the light blocking layer 26 and the light blocking layer 22) in a planar view, the light L2 is refracted toward the planar center of the pixel P, and thus the light is not blocked by the light blocking portion S, passes through the inside of the opening T of the pixel P, and is emitted toward the element substrate 20 side.

If travelling in a straight line as it is, Light L3 of parallel light that is incident on the inclined surface 12c from the outside of the curved surface portion 12b is blocked by the light blocking portion S as illustrated by a dashed line. In the liquid crystal device 1, the light L3 is refracted toward the planar center of the pixel P by the difference of the optical refractive index between the substrate 11 and the lens layer 13, and thus the light is not blocked by the light blocking portion S, passes through the inside of the opening T of the pixel P, and is emitted toward the element substrate 20 side. Since there is also a difference of optical refractive index between the lens layer 13 and the optical path length adjustment layer 14, the light is also refracted in the interface between the lens layer 13 and the optical path length adjustment layer 14, but description will be made later with regard to this.

In this way, in the liquid crystal device 1, the light L3 of parallel light that is blocked by the light blocking portion S when travelling in a straight line, can also be incident on the inside of the opening T of the pixel P and pass through the liquid crystal layer 40 by the action of the microlens ML. As a result, an amount of light that is emitted from the element substrate 20 side can be increased, and thus it is possible to increase utilization efficiency of light.

In addition, since the light L1 of parallel light that is incident on the flat portion 12a travels in a straight line as it is, and the parallel light that is incident on the inside of the inclined surface 12c is refracted at approximately the same angle as in the light L3, it is possible to decrease variation of the angle of the light that is incident on the liquid crystal layer 40, compared to when the entire concave portion 12 is configured by a curved surface portion with a light focusing action. As a result, the variation of the angle of the light with respect to an orientation of liquid crystal molecules can be decreased, and thus it is possible to increase a contrast ratio of an image that is displayed on the liquid crystal device 1.

Microlens Array Substrate

Figure 4:
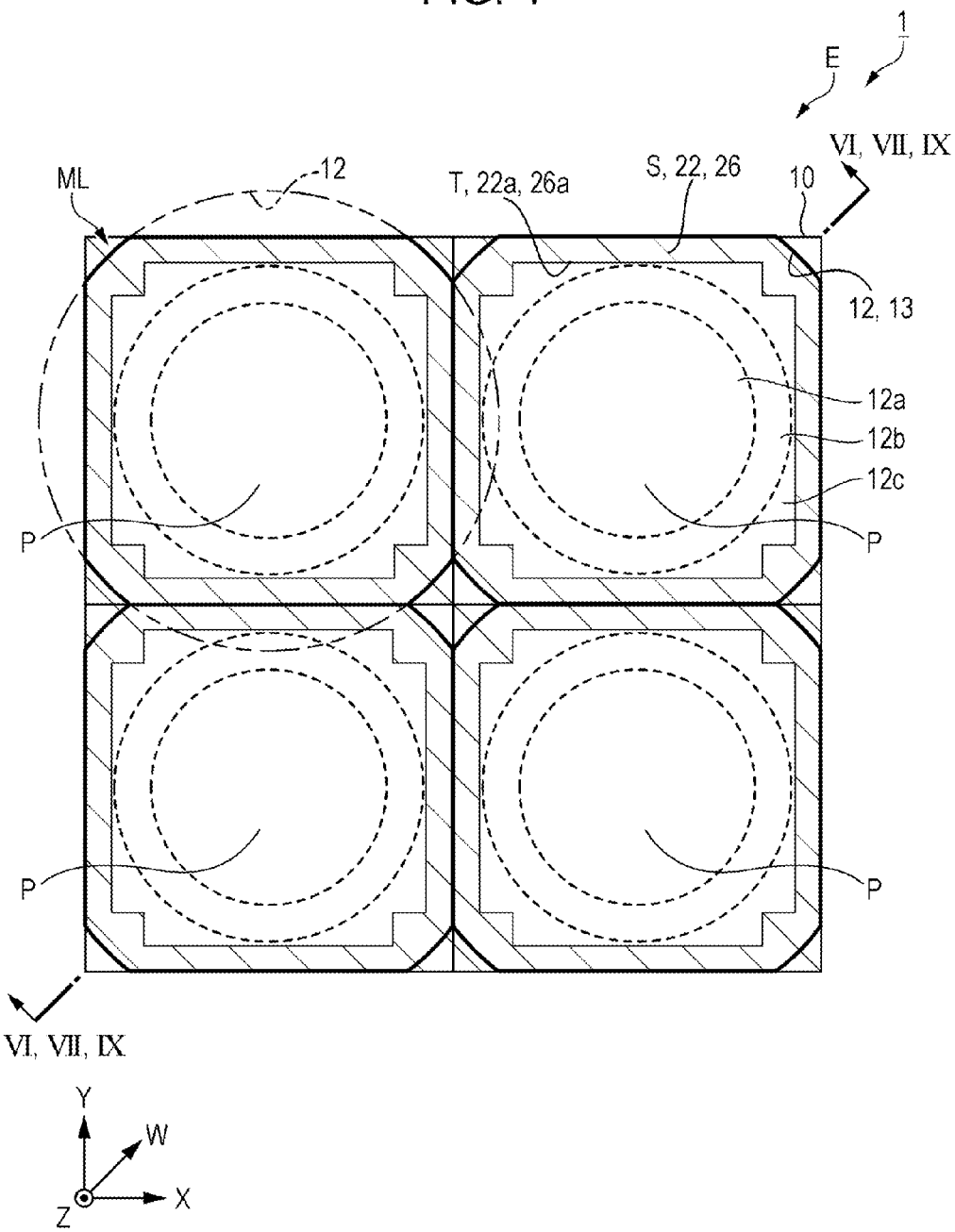
FIG. 4 is a schematic plan view illustrating a shape and disposition of light blocking portions and microlenses of the liquid crystal device according to the first embodiment.
Figure 5:
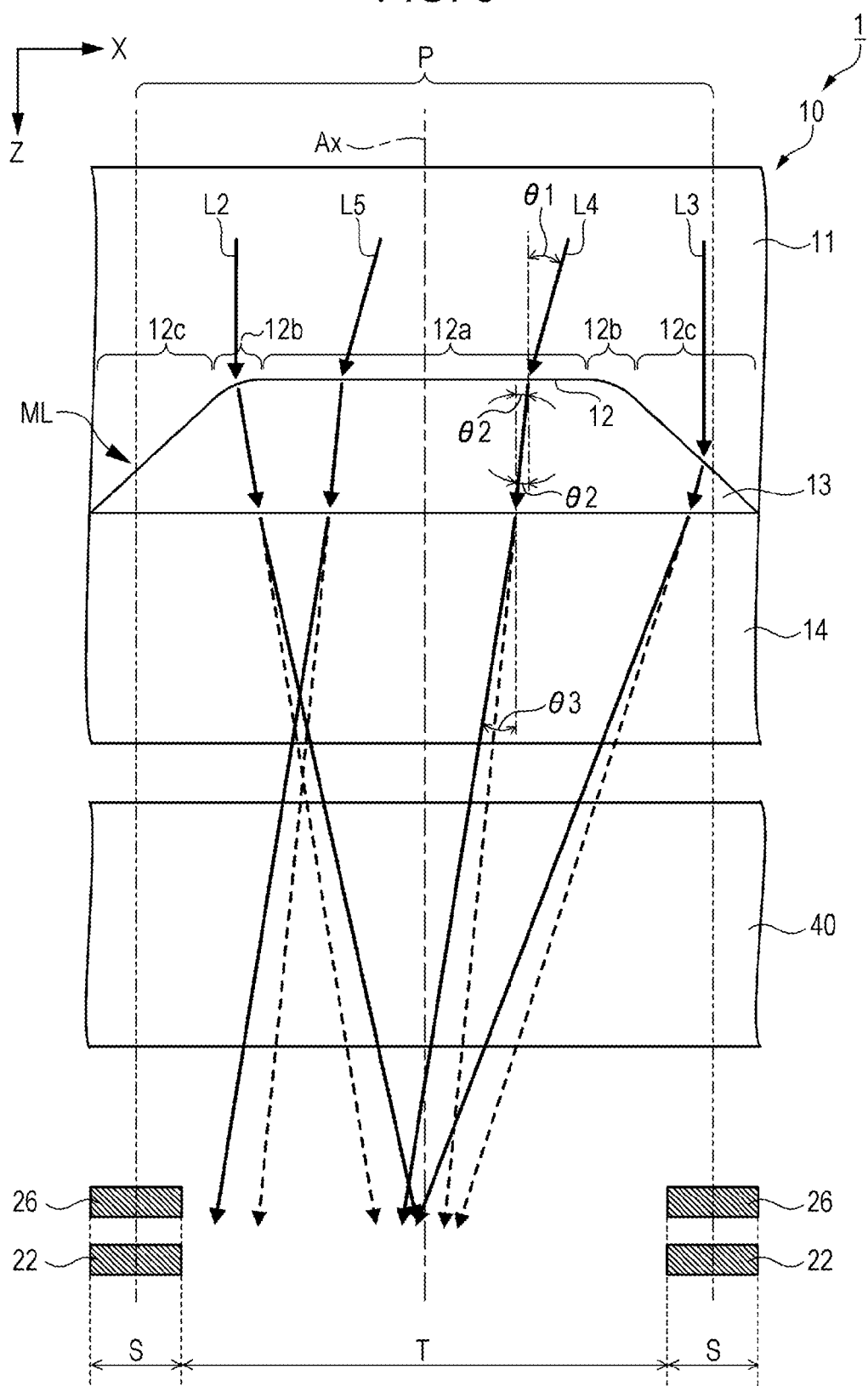
FIG. 5 is a schematic cross-sectional view illustrating an action of a microlens array substrate according to a first embodiment.
Figure 11:
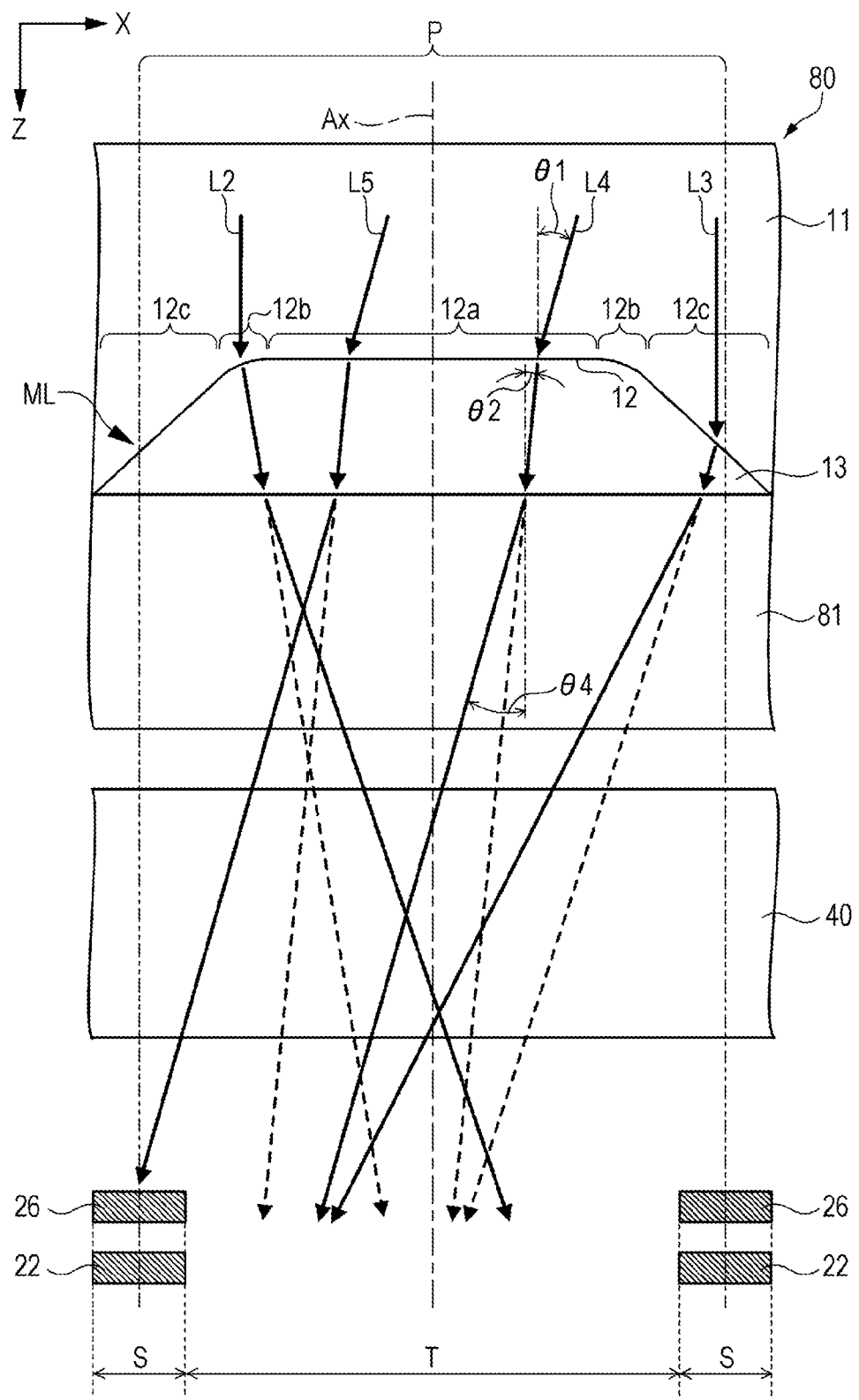
FIG. 11 is a schematic cross-sectional view comparatively illustrating an action of a microlens array substrate of the related art.

Subsequently, a detailed configuration and action of the microlens array substrate 10 according to the first embodiment will be described with reference to FIG. 4, FIG. 5, and FIG. 11. FIG. 4 is a schematic plan view illustrating a shape and disposition of the light blocking portions and the microlenses of the liquid crystal device according to the first embodiment. FIG. 5 is a schematic cross-sectional view illustrating an action of the microlens array substrate according to the first embodiment. FIG. 5 corresponds to a partially enlarged view of one pixel P in FIG. 3. Portions other than an essential portion are not illustrated. FIG. 11 is a schematic cross-sectional view comparatively illustrating an action of a microlens array substrate of the related art. Portions other than essential portions are not illustrated in FIG. 5 and FIG. 11.

As illustrated in FIG. 4, in the display area E of the liquid crystal device 1, the plurality of pixels P is arranged in a matrix in a predetermined arrangement pitch. In FIG. 4, four pixels P adjacent to each other are illustrated. Each of the pixels P has an approximately rectangular plane shape, and the pixels P adjacent to each other in the X direction and the Y direction are arrange so as to be in contact with each other. A direction along a diagonal line connecting vertices which is diagonally positioned in the pixel P is referred to as a W direction.

As illustrated by hatching in FIG. 4, in the display area E of the liquid crystal device 1, the light blocking portion S is provided in a lattice pattern. The light blocking portion S is configured by the light blocking layer 22 and the light blocking layer 26. In other words, at least one of the light blocking layer 22 and the light blocking layer 26 is disposed in the light blocking portion S. Among areas of each pixel P, an area that overlaps the light blocking portion S in a planar view is a non-opening area through which light does not pass, and an area that overlaps the opening T in a planar view is an opening area through which light passes. The TFT 24 is disposed in an area that overlaps the light blocking portion S in a planar view.

The light blocking portion S has a portion that extends in the X direction and a portion that extends in the Y direction. For example, the light blocking portion S has a portion that protrudes toward the opening T side at four corners. For example, a portion of the TFT 24, a relay electrode that is not illustrated, a capacitance electrode, or the like is disposed in the protruded portion of the light blocking portion S. Since the light blocking portion S is shaped in this way, it is possible to reliably block the TFT 24, even though the area of the light blocking portion S is reduced and thereby an opening ratio is increased.

The light blocking portion S has the openings T corresponding to each of the plurality of pixels P. The opening T has a outline shape in which four corners of an approximately rectangular shape are recessed. The opening T has a outline shape that is line-symmetric with respect to a straight line in the X direction and a straight line in the Y direction. The outline shape (plan shape of the light blocking portion S) of the opening T is not limited to this shape, and the four corners may have a outline shape that is not recessed, and may have a outline shape that is non-line-symmetric with respect to a straight line in at least one direction of the X direction and the Y direction.

The opening T is at an area in which the opening 22a overlaps the opening 26a in a planar view. When the light blocking layer 32 is also provided in the display area E, the light blocking portion S is configured by the light blocking layer 22, the light blocking layer 26, and the light blocking layer 32 and the opening T becomes an area in which the opening 22a, the opening 26a, and the opening of the light blocking layer 32 overlap each other in a planar view.

Each of the plurality of microlenses ML (concave portions 12) is arranged in the same arrangement pitch, in correspondence to each of the plurality of pixels P. The microlens ML (concave portion 12) is arranged so as to overlap the opening T of the pixel P in a planar view. As illustrated by a thick solid line, a plane shape of the microlens ML (concave portion 12) is an approximately rectangular shape, and has a size inscribed inside the pixel P. As illustrated by a two-dot chain line, a virtual outline of the concave portion 12 is a circular shape, and is larger than an inscribed circle of the pixel P and is smaller than a circumscribed circle of the pixel P, for example.

Interfaces between the microlenses adjacent to each other in the X direction and the Y direction are disposed in an area that overlaps a portion extending in the X direction of the light blocking portion S and a portion extending in the Y direction of the light blocking portion S in a planar view. In addition, the four corners of the microlens ML (concave portion 12) are respectively arranged in an area that overlaps a portion at which a portion extending in the X direction of the light blocking portion S intersects a portion extending in the Y direction of the light blocking portion S in a planar view.

The microlenses ML (concave portions 12) adjacent to each other in the X direction and the Y direction are connected to each other. For this reason, compared to when the microlenses ML adjacent to each other in the X direction and the Y direction are separated from each other, it is possible to further increase the light that is incident on the microlens ML. The microlenses ML (concave portions 12) adjacent to each other in the direction (W direction) along the diagonal line are separated to each other.

The concave portion 12 has a flat portion 12a disposed in the central portion, a curved surface portion 12b disposed in the periphery of the flat portion 12a, and an inclined surface 12c disposed in the periphery of the curved surface portion 12b. The flat portion 12a, the curved surface portion 12b, and the inclined surface 12c are continuously formed. The center in the design of the virtual outline of the concave portion 12 matches the planar center of the pixel P. The flat portion 12a and the curved surface portion 12b are formed in a concentric circle of the virtual outline (circle) of the concave portion 12.

The flat portion 12a is a bottom of the concave portion 12, and is disposed in the inside of the opening T of the pixel P in planar view. In other words, the inner edge of the light blocking portion S is disposed in the outside further than the outer edge of the flat portion 12a. Accordingly, the parallel light (the light L1 illustrated in FIG. 3) that is incident on the flat portion 12a of the microlens ML can pass through the inside of the opening T of the pixel P without being blocked by the light blocking portion S, even though the light travels in a straight line as it is without being refracted and is emitted.

The lens layer 13 is disposed so as to fill the concave portion 12. Thus, in the microlenses ML (concave portions 12) adjacent to each other in the X direction and the Y direction, the lens layer 13 is continuously provided (refer to FIG. 3). In addition, in the microlenses ML (concave portions 12) adjacent to each other in the direction (W direction) along the diagonal line, the lens layer 13 is divided (refer to FIG. 7D).

An optical axis Ax of the microlens ML illustrated in FIG. 5 is a straight line that passes through the planar center of the microlens ML (concave portion 12), and is parallel to the normal direction to the surface of the substrate 11. The lights L2 and L3 illustrated in FIG. 5 correspond to the lights L2 and L3 of parallel light illustrated in FIG. 3. As described above, the lights L2 and L3 are refracted at the interface between the substrate 11 and the lens layer 13, but are also refracted at the interface between the lens layer 13 and the optical path length adjustment layer 14.

For example, as illustrated in FIG. 5, the light L2 that is incident on the curved surface portion 12b and is refracted toward the optical axis Ax at the interface between the substrate 11 and the lens layer 13, is refracted toward the optical axis Ax further than the optical path at the time of travelling in a straight line as it is as illustrated by a dashed line, at the interface between the lens layer 13 and the optical path length adjustment layer 14, and passes through the inside of the opening T of the pixel P. The light L3 that is incident on the inclined surface 12c and is refracted toward the optical axis Ax at the interface between the substrate 11 and the lens layer 13, is also refracted toward the optical axis Ax further than the optical path at the time of travelling in a straight line as it is as illustrated by a dashed line, at the interface between the lens layer 13 and the optical path length adjustment layer 14, and passes through the inside of the opening T of the pixel P.

Next, a case in which the inclined lights L4 and L5 are incident on the flat portion 12a of the microlens ML will be considered. An incident angle of the light L4 that is an inclined light is referred to as θ1. While not being illustrated, an incident angle of the light L5 that is an inclined light is referred to as θ1 as well. The light L4 that is obliquely incident on the flat portion 12a toward the optical axis Ax is refracted at the interface between the substrate 11 and the lens layer 13 by a difference of optical refractive index between the substrate 11 and the lens layer 13. If a refraction angle thereof is referred to as θ2, since the optical refractive index of the lens layer 13 is larger than the optical refractive index of the substrate 11, the refraction angle θ2 becomes smaller than the incident angle θ1.

The light L4 that passes through the lens layer 13 is refracted at the interface between the lens layer 13 and the optical path length adjustment layer 14 by a difference of optical refractive index between the lens layer 13 and the optical path length adjustment layer 14. If a refraction angle thereof is referred to as θ3, since the optical refractive index of the optical path length adjustment layer 14 is smaller than the optical refractive index of the lens layer 13, the refraction angle θ3 becomes larger than the incident angle θ2. Thus, the light L4 is refracted toward the optical axis Ax further than the optical path at the time of travelling in a straight line as it is as illustrated by the dashed line, is emitted from the microlens ML, and passes through the inside of the opening T of the pixel P.

The light L5 that is obliquely incident on the planarazing portion 12a toward a side farther from the optical axis Ax is refracted in the same manner as the light L4 at the interface between the substrate 11 and the lens layer 13, and the interface between the lens layer 13 and the optical path length adjustment layer 14. While not being illustrated, since the incident angle of the light L5 is θ1, the light L5 is refracted at the refractive angle θ2 in the same manner as the light L4, and is further refracted at the refraction angle θ3. Then, the light L5 is refracted toward a side farther from the optical axis Ax further than the optical path at the time of travelling in a straight line as it is as illustrated by the dashed line, is emitted from the microlens ML, and passes through the inside of the opening T of the pixel P.

Here, since the optical refractive index of the optical path length adjustment layer 14 is smaller than the optical refractive index of the substrate 11, a difference between the incident angle θ2 at the time of being refracted at the interface between the lens layer 13 and the optical path length adjustment layer 14, and the refraction angle θ3 is smaller than a difference between the incident angle θ1 at the time of being refracted at the interface between the substrate 11 and the lens layer 13, and the refraction angle θ2. That is, the refraction angle θ3 is smaller than the incident angle θ1. Thus, the light L4 and L5 that are incident on the microlens ML are emitted from the microlens ML in a state where an angle with respect to the optical axis Ax is smaller than an angle at the time of being incident.

Next, the microlens array substrate 10 according to the present embodiment will be compared with a microlens array substrate of a configuration of the related art in which the optical refractive index of the optical path length adjustment layer 14 is the same as the optical refractive index of the lens layer 13, as illustrated in JP-A-2004-4745. A microlens array substrate 80 of the related art illustrated in FIG. 11 includes the substrate 11, the lens layer 13, and an optical path length adjustment layer 81. The optical path length adjustment layer 81 is configured by a glass substrate, $SiO_2$, or the like, and has an optical refractive index that is the same as that of the substrate 11.

The incident angle θ1 when the lights L4 and L5 are incident on the flat portion 12a of the microlens ML, and the refraction angle θ2 when the lights are refracted at the interface between the substrate 11 and the lens layer 13, are the same as in the case illustrated in FIG. 5. As illustrated in FIG. 11, if a refraction angle at which the light L4 is refracted at the interface between the lens layer 13 and the optical path length adjustment layer 81 is referred to as θ4, since the optical refractive index of the optical path length adjustment layer 81 is the same as the optical refractive index of the substrate 11, the refraction angle θ4 is the same as the incident angle θ1, and is larger than the refraction angle θ3 illustrated in FIG. 5.

Thus, in the microlens array substrate 80 of the related art, the lights L4 and L5 of inclined light that are incident on the microlens ML are emitted from the microlens ML in a state where the angle with respect to the optical axis Ax is returned to the angle which is the same as an angle at the time of being incident. For this reason, the light L5 that is incident toward a side farther from the optical axis Ax is emitted from the microlens ML toward a side farther from the optical axis Ax at the same angle as an angle at the time of being incident, is blocked by the light blocking portion S (light blocking portion 26 and light blocking portion 22), and thus utilization efficiency of light is decreased.

In this way, if the central portion of the microlens ML (concave portion 12) is the flat portion 12a, the parallel light incident on the central portion can travel in a straight line as it is, without being refracted, compared to when the central portion is a curved surface portion. However, the inclined light incident on the central portion is not focused toward the optical axis Ax, unlike the central portion is a curved surface portion. For this reason, there is a high possibility that the inclined light which is incident toward a side farther from the optical axis Ax may be blocked by the light blocking portion S, in the flat portion 12a of the microlens ML, in the same manner as the light L5.

In addition, in the microlens array substrate 80 of the related art, an angle at which the light L2 of parallel light incident on the curved surface portion 12b, and light L3 of parallel light incident on the inclined surface 12c, are refracted at the interface between the lens layer 13 and the optical path length adjustment layer 81, is larger than that in a case of the first embodiment illustrated in FIG. 5. For this reason, when the lights L2, L3, and L4 are emitted from the microlens ML and pass through the liquid crystal layer 40, an angle with respect to an orientation of liquid crystal molecules is large, and thus a contrast ratio is decreased.

In contrast to this, in the microlens array substrate 10 according to the present embodiment illustrated in FIG. 5, the refraction angle θ3 at the time of being refracted at the interface between the lens layer 13 and the optical path length adjustment layer 14 can be smaller than the incident angle θ1, and thus it is possible to decrease an angle at the time of being emitted from the microlens ML, with respect to an angle when the inclined light is incident on the flat portion 12a of the microlens ML. Thus, in the same manner as the light L5, the light that is incident toward a side farther from the optical axis Ax on the flat portion 12a of the microlens ML, and is blocked by the light blocking portion S when proceeding at the incident angle θ1 as it is, can be led to the inside of the opening T of the pixel P. Accordingly, an amount of light that passes through the inside of the opening T of the pixel P is increased, and thus it is possible to increase utilization efficiency of light in the liquid crystal device 1.

Then, when the lights L2, L3, and L4 are emitted from the microlens ML and pass through the liquid crystal device 40, an angle with respect to an orientation of liquid crystal molecule can be decreased, and thus it is possible to increase a contrast ratio of an image that is displayed on the liquid crystal device 1. Thus, when the liquid crystal device 1 is used as a liquid crystal light valve of a projector, it is possible to suppress vignetting of the light that is incident on a projection lens, and to increase utilization efficiency of light in the projector or a contrast ratio.

In addition, the expression that an amount of light that is blocked by the light blocking portion S is small means that an amount of light which is applied to the light blocking portion S is small. For this reason, heat of the light blocking portion S is reduced by absorbing the applied light, and thus it is possible to suppress a temperature increase of the liquid crystal device 1, and to attain a long lifespan of the liquid crystal device 1 or a low power consumption by simplifying a cooling mechanism.

Furthermore, in the microlens array substrate 10, a difference of optical refractive index between the lens layer 13 and the optical path length adjustment layer 14 is small, compared to the microlens array substrate 80 of the related art, and thus when the inclined light is incident, reflection of the inclined light at the interface between the lens layer 13 and the optical path length adjustment layer 14 is suppressed. This also contributes to an increase of utilization efficiency of light in the liquid crystal device 1. Then, since the optical path length adjustment layer 14 is configured with SiON including nitride (N), moisture penetration into the liquid crystal layer 40 from the outside is suppressed, compared to when the optical path length adjustment layer 14 is configured with a glass substrate or SiO2. This also contributes to a long lifespan of the liquid crystal device 1.

Fabricating Method of Microlens Array Substrate

Next, a fabricating method of the microlens array substrate 10 according to the first embodiment will be described. FIG. 6A to FIG. 7D are schematic cross-sectional views illustrating a fabricating method of the microlens array substrate according to the first embodiment. Specifically, each figure of FIG. 6A to FIG. 7D corresponds to schematic cross-sectional views taken along a line (W direction) IV-IV of FIG. 4.

Figure 6A:
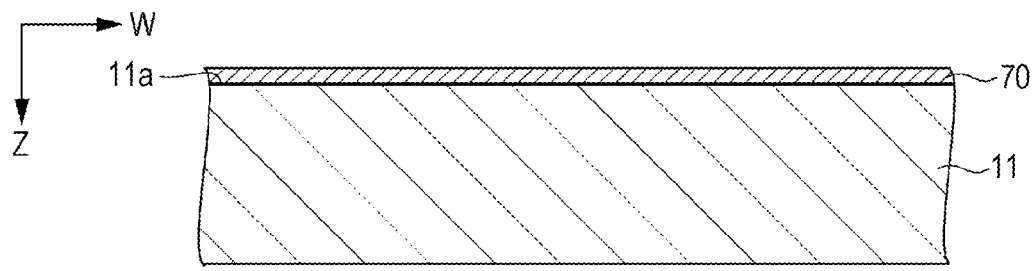
FIGS. 6A to 6D are schematic cross-sectional views illustrating a fabricating method of the microlens array substrate according to the first embodiment.

To begin with, as illustrate in FIG. 6A, a control film 70 formed of an oxide film such as SiO2 is formed on a surface 11a of the substrate 11 that has optical transmissivity and is formed of quartz or the like. The control film 70 has an etching rate of isotropic etching different from that of the substrate 11, and has a function to adjust an etching rate of a width direction (W direction, X direction, and Y direction) with respect to an etching rate of a depth direction (Z direction) when the concave portion 12 is formed.

After the control film 70 is formed, annealing of the control film 70 is performed at a predetermined temperature. The etching rate of the control film 70 is changed by temperature at the time of annealing. Thus, by appropriated setting the temperature at the time of annealing, it is possible to adjust the etching rate of the control film 70.

Figure 6B:
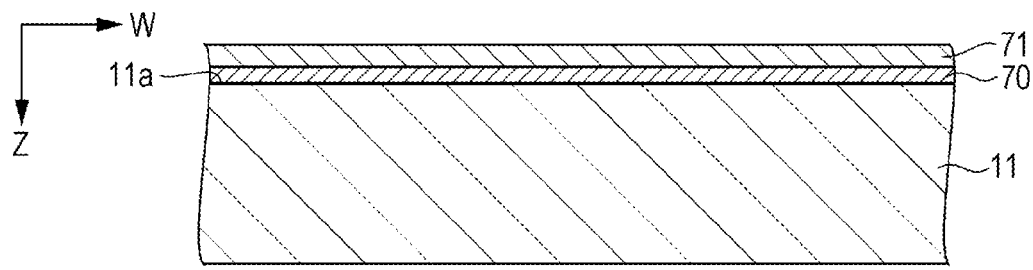
Figure 6C:
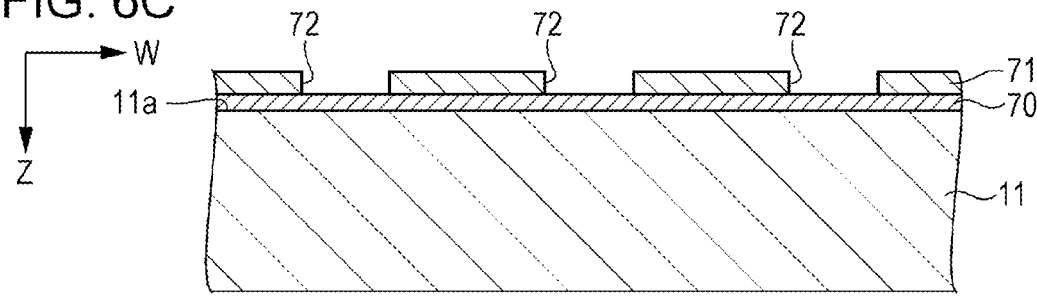

Next, as illustrated in FIG. 6B, a mask layer 71 is formed on the control film 70. Subsequently, as illustrated in FIG. 6C, the mask layer 71 is patterned, and openings 72 are formed in the mask layer 71. The opening 72 has a circular shape in a planar view as that of the flat portion 12a of the concave portion 12 to be formed, and a shape and a size thereof are set so as to be approximately the same as a shape and a size of the flat portion 12a. In other words, the shape and size of the flat portion 12a of the concave portion 12 to be formed is determined by the shape and size of the opening 72 of the mask layer 71.

Figure 6D:
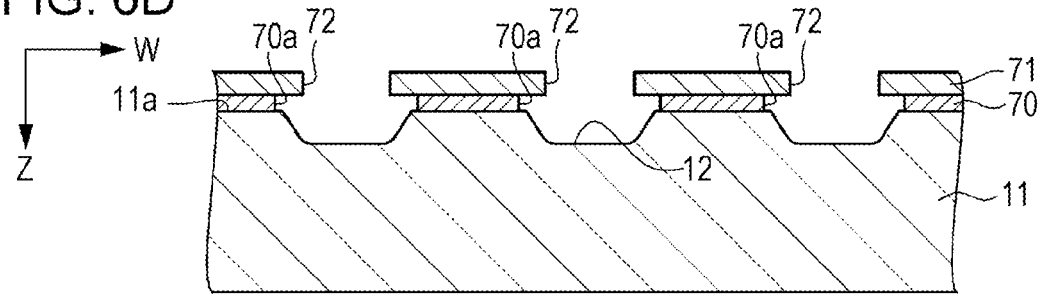

Next, as illustrated in FIG. 6D, isotropic etching is performed in the substrate 11 that is covered with the control film 70, via the opening 72 of the mask layer 71. For the isotropic etching, an etching solution (for example, hydrofluoric acid solution) is used in which the etching rate of the control film 70 is higher than the etching rate of the substrate 11. By the isotropic etching, the control film 70 and the substrate 11 are etched from the opening 72, and thereby, an opening 70a is formed in the control film 70, and the concave portion 12 is formed in the substrate 11.

Figure 7A:
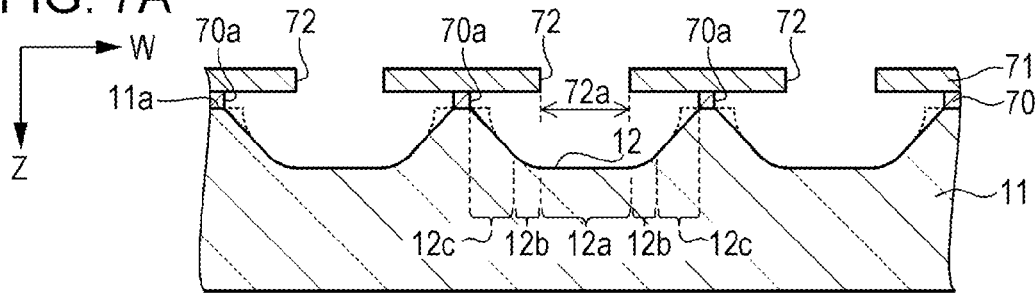
FIGS. 7A to 7D are schematic cross-sectional views illustrating a fabricating method of the microlens array substrate according to the first embodiment.

Next, as illustrated in FIG. 7A, while the isotropic etching is performed, the concave portion 12 is enlarged, and a portion corresponding to the opening 72 of the mask layer 71, in the concave portion 12 in a planar view, becomes approximately flat. Accordingly, the flat portion 12a is formed in a central portion of the concave portion 12. In addition, the curved surface portion 12b is formed so as to surround the periphery of the flat portion 12a.

Here, when the control film 70 is not provided between the substrate 11 and the mask layer 71, as illustrated by a dashed line in FIG. 7A, the curved surface portion 12b continues to form until reaching the surface 11a of the substrate 11. In the present embodiment, the control film 70 is provided between the substrate 11 and the mask layer 71, and etching amount per unit time of the control film 70 for isotropic etching is more than etching amount per unit time of the substrate 11.

Thus, since the enlarged amount of the opening 70a of the control film 70 is more than the enlarged amount in a depth direction of the concave portion 12, the width direction of the concave portion 12 is also enlarged according to enlargement of the opening 70a. For this reason, etching amount per unit time in the width direction of the substrate 11 is more than etching amount per unit time in the depth direction. Accordingly, the inclined surface 12c of a tapered shape is formed so as to surround the periphery of the curved surface portion 12b.

As described above, the shape and size of the flat portion 12a of the concave portion 12 can be controlled by the shape and size of the opening 72 of the mask layer 71. In addition, respective sizes of the curved surface portion 12b and the inclined surface 12c in the concave portion 12 are controlled by the etching rate of the width direction with respect to the etching rate of the depth direction of the substrate 11, and a difference between the etching rates are adjusted by temperature setting when annealing of the control film 70 is performed.

In the present step, as illustrated in FIG. 7A, in a state where the concave portions 12 adjacent to each other are separated from each other, the isotropic etching is completed. If the isotropic etching is performed until the concave portions 12 adjacent to each other are connected to each other, there is a possibility that the mask layer 71 may rise above and peel off from the substrate 11. In the present embodiment, the isotropic etching is completed in a state where the surface 11a of the substrate 11 remains between the concave portions 12 adjacent to each other, and thus it is possible to support the mask layer 71 until the isotropic etching is completed.

A virtual plane shape of the concave portion 12 to be formed is a circular shape which is obtained by enlarging a plane shape of the opening 72 of the mask layer 71, but the concave portions 12 adjacent to each other in the X direction and the Y direction are connected to each other, and thus the plane shape of the concave portion 12 is an approximately rectangular shape in which four corners are spherically formed.

Figure 7B:
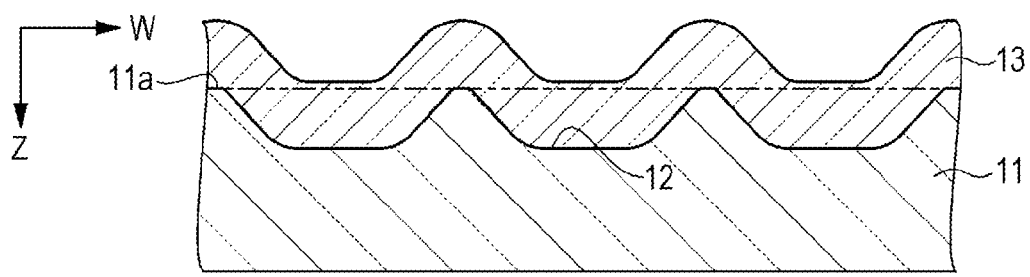

Next, as illustrate in FIG. 7B, after the mask layer 71 is removed from the substrate 11, an inorganic material with optical transmissivity and an optical refractive index higher than that of the substrate 11 is accumulated so as to cover the surface 11a side of the substrate 11 and fill the concave portion 12, and thereby the lens layer 13 is formed. The lens layer 13 can be formed using, for example, a CVD method. Since the lens layer 13 is formed so as to fill the concave portions 12, the lens layer 13 has a roughness shape in which roughness caused by the concave portion 12 of the substrate 11 is reflected.

Figure 7C:
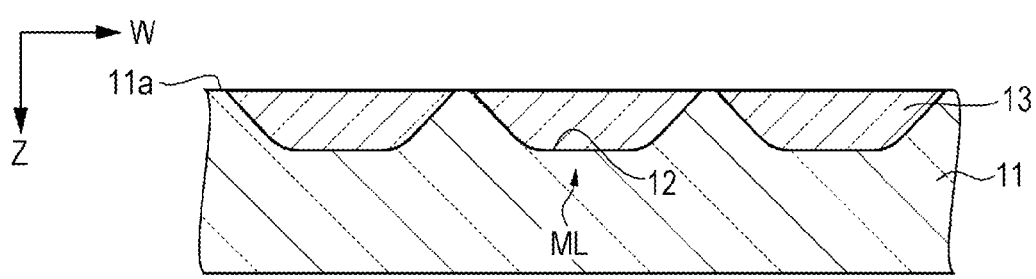

Subsequently, planarization processing is performed with respect to the lens layer 13. In the planarization processing, a portion (portion above the two-dot chain line illustrated in FIG. 7B) in which roughness on a surface side of the lens layer 13 is formed is ground using, for example, chemical mechanical polishing (CMP) processing or the like, so as to be removed, and thereby a surface of the lens layer 13 is planarized, as illustrated in FIG. 7C. The concave portion 12 is filled with the material of the lens layer 13, and thus microlens ML is configured.

Figure 7D:
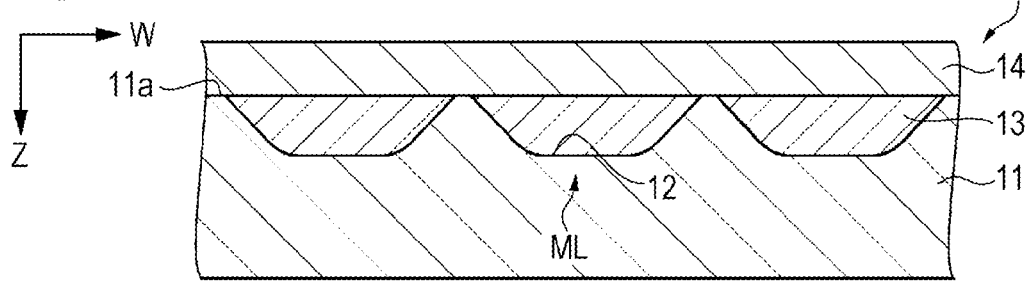

Next, as illustrated in FIG. 7D, an inorganic material with optical transmissivity and an optical refractive index which is higher than that of the substrate 11 and is lower than that of the lens layer 13, is accumulated so as to cover the surface 11a of the substrate 11 and the lens layer 13, and thus the optical path length adjustment layer 14 is formed. The optical path length adjustment layer 14 can be formed using, for example, a CVD method. Accordingly, the microlens array substrate 10 is completed.

While not being illustrated, in the microlens of the related art in which the concave portion is configured with a curved surface, an opening smaller than that of the present embodiment is formed in the mask layer, isotropic etching processing is performed on the substrate via the opening, and thereby the substrate is etched in an approximately spherical surface shape and thus the concave portion of a curved surface shape is formed. At this time, when a diameter of a concave portion to be formed is the same as a maximum diameter (diameter in the W direction) of the concave portion 12 according to the present embodiment, a depth of the concave portion of a curved surface shape becomes larger (deeper) than a depth of the concave portion 12 according to the present embodiment. For this reason, compared to the present embodiment, etching amount of the substrate, and the used amount of the lens layer for filling the concave portion are increased, and thus the ground amount in the CMP processing step is also increased. As a result, workload in the step is increased.

According to the configuration of the microlens ML according to the present embodiment, since the flat portion 12a is provided in the central portion of the concave portion 12, the depth of the concave portion 12 becomes shallow, and thus it is possible to decrease workload of fabricating step of the microlens array substrate 10 or to decrease the used amount of a material. In addition, since a film thickness of the accumulated lens layer 13 becomes more uniform and a roughness shape of the surface is decreased, it is possible to improve flatness of the surface of the lens layer 13.

Next, the light blocking layer 32, the protection layer 33, the common electrode 34, and the orientation film 35 are sequentially formed on the microlens array substrate 10 using a known technology, and thereby the counter substrate 30 is obtained. In addition, the light blocking layer 22, the insulating layer 23, the TFT 24, the insulating layer 25, the light blocking layer 26, the insulating layer 27, the pixel electrode 28, and orientation film 29 are sequentially formed on the substrate 21, and thus element substrate 20 is obtained.

Next, an adhesive with a thermosetting property or an optical curable property is disposed between the element substrate 20 and the counter substrate 30, as a sealing material 42 (refer to FIG. 1), is cured, and bonds the element substrate 20 to the counter substrate 30. Then, liquid crystal is inserted in a space that is formed by the element substrate 20, the counter substrate 30, and the sealing material 42, and thereby the liquid crystal device 1 is completed. Before the element substrate 20 is bonded to the counter substrate 30, the liquid crystal may be disposed in an area that is surrounded by the sealing material 42.

Second Embodiment

Figure 8:
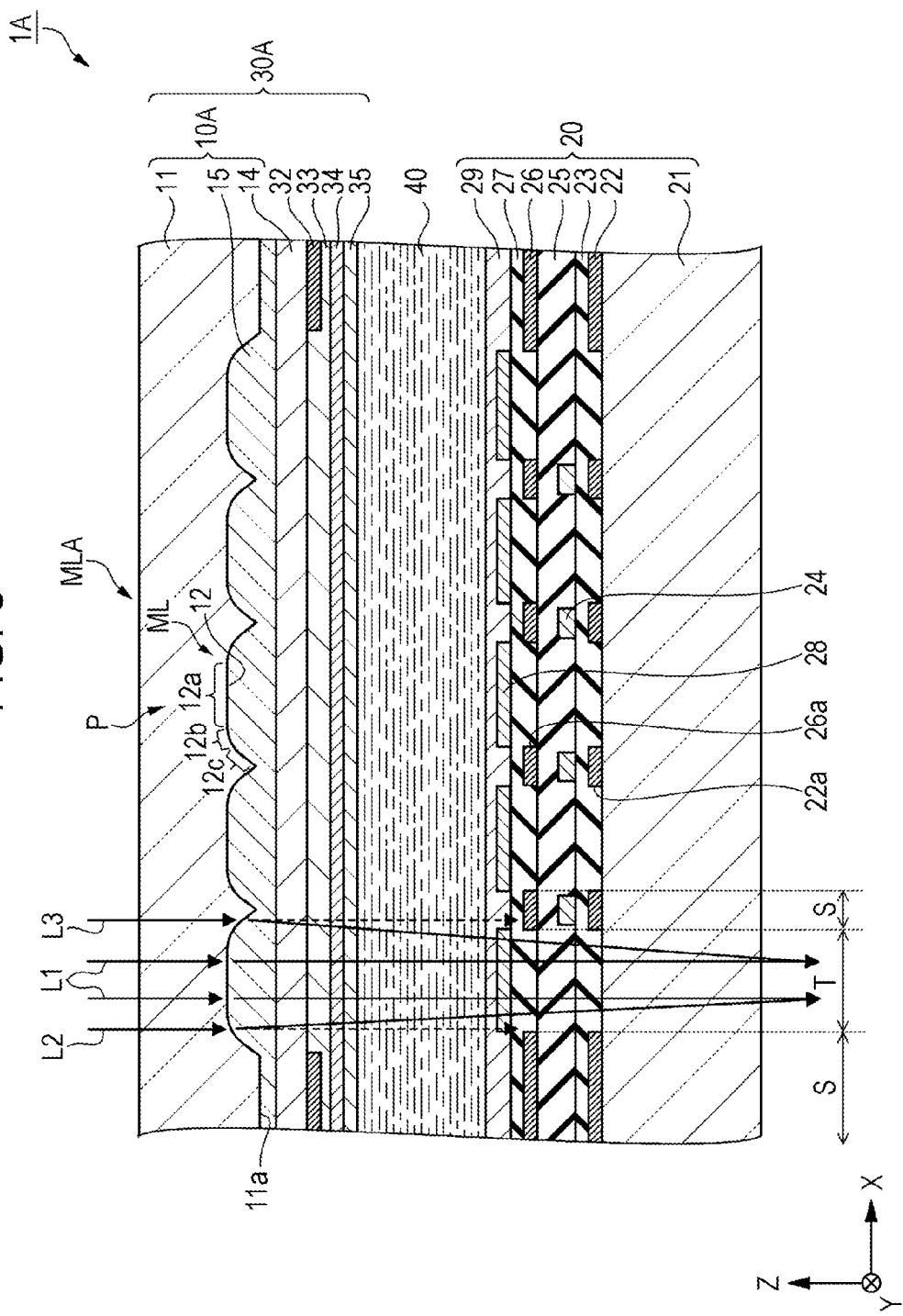
FIG. 8 is a schematic cross-sectional view illustrating a configuration of a liquid crystal device according to a second embodiment.

A microlens array substrate including a liquid crystal device according to a second embodiment has an approximately the same configuration with regard to the first embodiment except that thicknesses of lens layers are different from each other. FIG. 8 is a schematic cross-sectional view illustrating a configuration of a liquid crystal device according to the second embodiment. Specifically, FIG. 8 corresponds to a schematic cross-sectional view taken along line VIII-VIII of FIG. 1. The same symbols or reference numerals will be attached to the same configuration elements as in the first embodiment, and description thereof will be omitted.

Microlens Array Substrate

As illustrated in FIG. 8, a liquid crystal device 1A according to the second embodiment includes a counter substrate 30A in which a microlens array substrate 10A is included. The microlens array substrate 10A according to the second embodiment includes the substrate 11, a lens layer 15, and the optical path length adjustment layer 14.

The lens layer 15 is formed of an inorganic material that is the same as that of the lens layer 13 according to the first embodiment, and is formed with a layer thickness thicker than the lens layer 13. More specifically, the lens layer 15 is thicker than a depth of the concave portion 12, and is provided so as to cover the surface 11a of the substrate 11. Thus, the first embodiment has a configuration (refer to FIG. 4) in which the lens layer 13 is divided by the microlenses ML (concave portions 12) adjacent to each other in a direction (W direction) along the diagonal line of the pixel P. In contrast to this, the second embodiment has a configuration (refer to FIG. 9C) in which the lens layer 15 is continuously provided by the microlenses ML (concave portion 12) adjacent to each other in the W direction.

In the second embodiment, the optical refractive index of the substrate 11, the lens layer 15, and the optical path length adjustment layer 14 are in the same relationship as in the first embodiment, and thus it is possible to increase utilization efficiency of light and a contrast ratio of the liquid crystal device 1A, in the same manner as in the first embodiment. Furthermore, in the second embodiment, when the lens layer 15 is formed of SiON, the layer thickness of the lens layer 15 with a high ratio of nitride (N) included in SiON is thick, compared to the first embodiment, and thus it is possible to more effectively suppress moisture penetration into the liquid crystal layer 40 from the outside.

Fabricating Method of Microlens Array Substrate

Figure 9A:
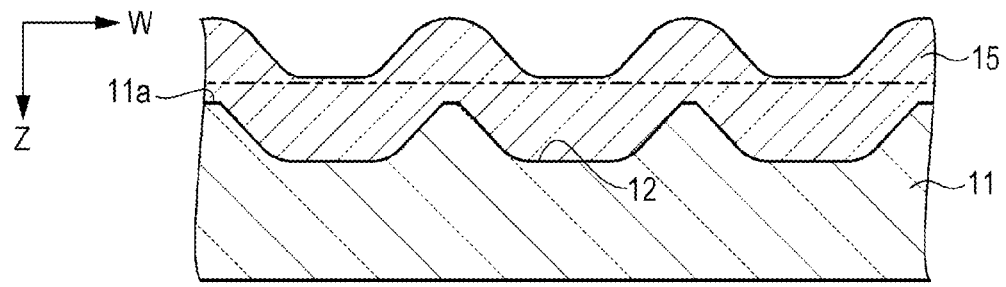
FIGS. 9A to 9C are schematic cross-sectional views illustrating a fabricating method of a microlens array substrate according to the second embodiment.
Figure 9B:
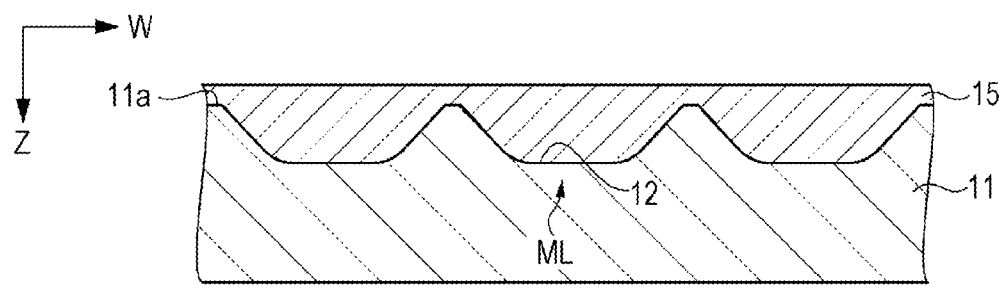
Figure 9C:
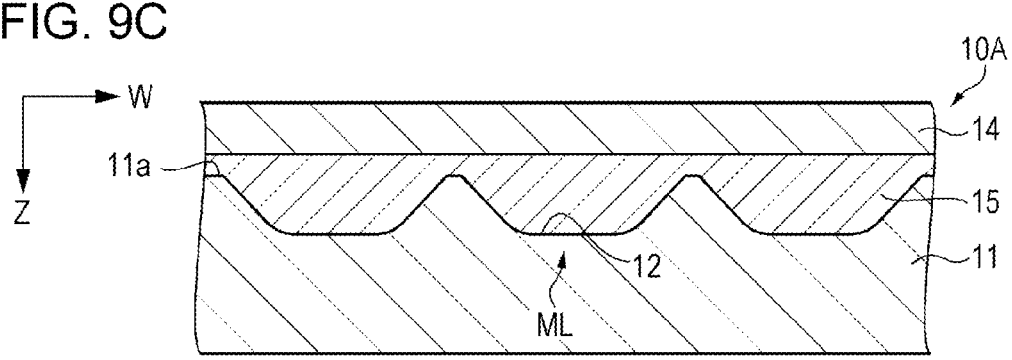

Next, a fabricating method of the microlens array substrate 10A according to the second embodiment will be described. FIGS. 9A to 9C are schematic cross-sectional views illustrating a fabricating method of a microlens array substrate according to a second embodiment. Specifically, each figure of FIGS. 9A to 9C corresponds to a schematic cross-sectional view taken along line (W direction) IV-IV of FIG. 4.

The fabricating method of the microlens array substrate 10A according to the second embodiment is different from that of the first embodiment in that the lens layer 15 is thickly formed, and the steps (FIGS. 6A to 6D, and FIG. 7A) that are provided until the concave portion 12 is formed are the same. After the concave portion 12 is formed, an inorganic material with an optical refractive index higher than that of the substrate 11 is accumulated so as to cover the surface 11a side of the substrate 11 and to fill the concave portion 12, and thereby the lens layer 15 is formed, as illustrated in FIG. 9A. The lens layer 15 is formed to be thicker than the lens layer 13 according to the first embodiment.

Subsequently, planarization processing is performed with respect to the lens layer 15. In the planarization processing, a portion (a portion above a two-dot chain line illustrated in FIG. 9A) in which roughness of the surface of the lens layer 15 is formed is ground, and removed, such that a thickness covering the surface 11a of the substrate 11 remains between the microlens concave portions 12 adjacent to each other in the W direction. Accordingly, as illustrated in FIG. 9B, the surface of the lens layer 15 is planarized. Then, as illustrated in FIG. 9C, an inorganic material with an optical refractive index higher than that of the substrate 11 and lower than that of the lens layer 15 is accumulated so as to cover the lens layer 15, and thereby the optical path length adjustment layer 14 is formed. Accordingly, the microlens array substrate 10A is completed.

In the fabricating method of the microlens array substrate 10A according to the second embodiment, in the step of planarizing the surface of the lens layer 15 illustrated in FIG. 9B, the grinding is completed in a state where the thickness covering the surface 11a of the substrate 11 between the microlens concave portions 12 adjacent to each other in the W direction, remains, and thus it is possible to prevent excessive grinding of the lens layer 15. If the lens layer 15 is excessively ground until being thinned more than a thickness of filling a depth of the concave portion 12, a diameter (area) of the microlens ML is decreased, and thus utilization efficiency of light is decreased. In the second embodiment, it is possible to suppress a decrease of utilization efficiency of light caused by excessive grinding of the lens layer 15.

Third Embodiment

Electronic Apparatus

Figure 10:
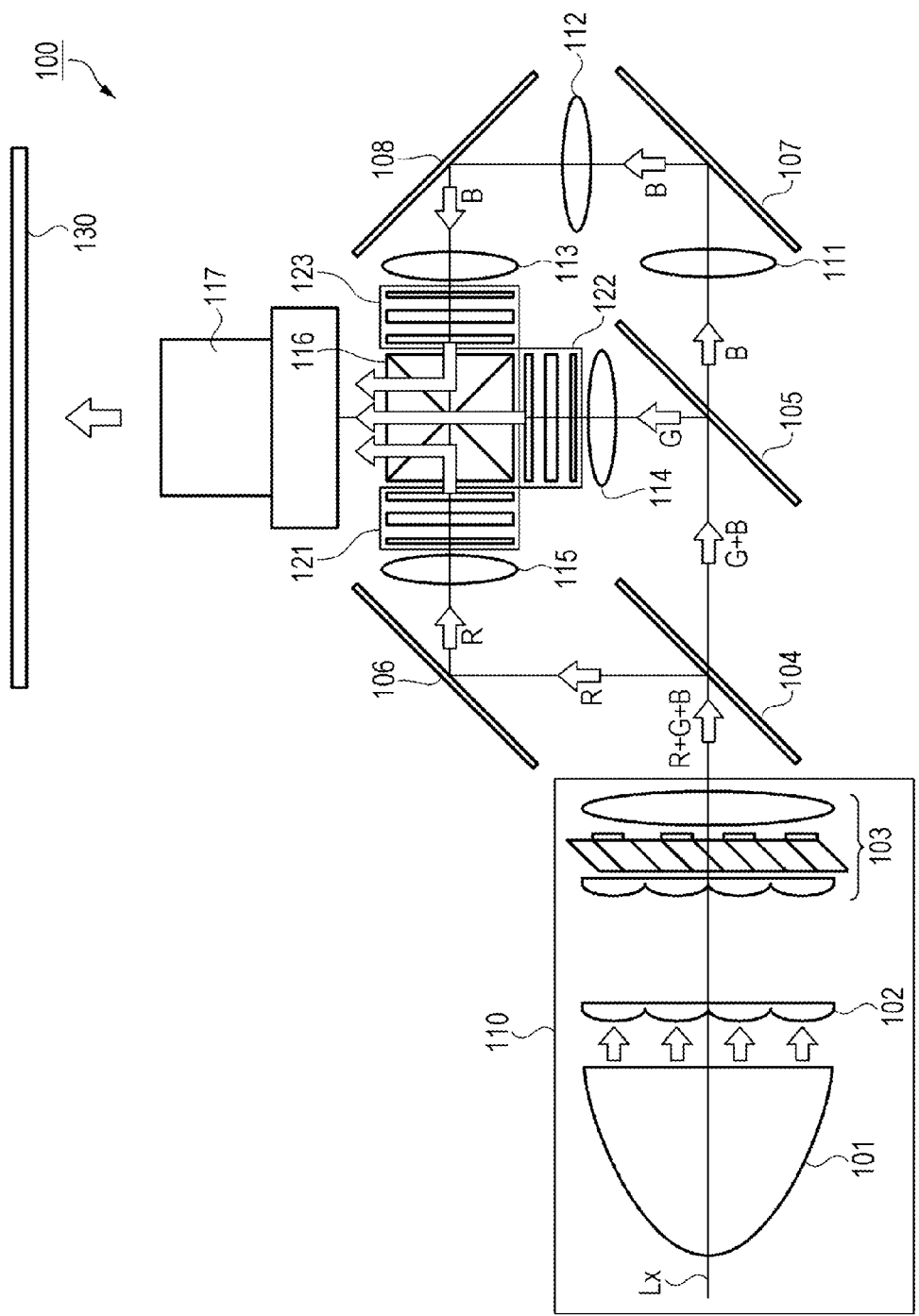
FIG. 10 is a schematic view illustrating a configuration of a projector as an electronic apparatus according to a third embodiment.

Next, an electronic apparatus according to a third embodiment will be described with reference to FIG. 10. FIG. 10 is a schematic view illustrating a configuration of a projector which functions as an electronic apparatus according to the third embodiment.

As illustrated in FIG. 10, a projector (projection type display device) 100 as the electronic apparatus according to the third embodiment includes a polarization illumination device 110, two dichroic mirrors 104 and 105, three reflection mirrors 106, 107, and 108, five relay lenses 111, 112, 113, 114, and 115, three liquid crystal light valves 121, 122, and 123, a cross dichroic prism 116, and a projection lens 117.

The polarization illumination device 110 includes a lamp unit 101 as a light source configured by a white light source such as an ultra-high pressure mercury lamp or a halogen lamp, an integrator lens 102, and a polarization conversion element 103. The lamp unit 101, the integrator lamp 102, and the polarization conversion element 103 are disposed along a system optical axis Lx.

The dichroic mirror 104 reflects a red light (R), and makes a green light (G) and a blue light (B) pass through, among the polarized light beam emitted from the polarization illumination device 110. Another dichroic mirror 105 reflects the green light (G) that passes through the dichroic mirror 104, and makes the blue light (B) pass through.

The red light (R) reflected by the dichroic mirror 104 is reflected by the reflection mirror 106, and thereafter is incident on the liquid crystal light valve 121 via the relay lens 115. The green light (G) reflected by the dichroic mirror 105 is incident on the liquid crystal light valve 122 via the relay lens 114. The blue light (B) passing through the dichroic mirror 105 is incident on the liquid crystal light valve 123 via a light guide system that is configured by three relay lenses 111, 112, and 113, and two reflection mirrors 107 and 108.

The liquid crystal light valves 121, 122, and 123 of a transmission type as an optical modulation element are respectively disposed so as to face incident surfaces of a cross dichroic prism 116 for each color light. Color light that is incident on the liquid crystal light valves 121, 122, and 123 is modulated based on video information (video signal), and is emitted toward the cross dichroic prism 116.

The cross dichroic prism 116 is configured by four rectangular prisms bonded to each other, and a dielectric multilayer film for reflecting red light and a dielectric multilayer film for reflecting blue light are formed in a cross shape in an internal surface thereof. Three color lights are synthesized by the dielectric multilayer films, and lights indicating a color image are synthesized. The synthesized light is projected on a screen 130 by a projection lens 117 that is a projection optical system, and an image is enlarged to be displayed.

Either the liquid crystal device 1 that includes the microlens array substrate 10 according to the above-described embodiment, or the liquid crystal device 1A that includes the microlens array substrate 10A is applied to the liquid crystal light valve 121. The liquid crystal light valve 121 is disposed so as to have a gap between a pair of polarization elements that is disposed in a cross nicol in an incident side and an emission side for color lights. The other liquid crystal light valves 122 and 123 are configured in the same manner.

According to a configuration of the projector 100 of the third embodiment, since the liquid crystal devices 1 and 1A that, even though a plurality of pixels P is disposed with high definition, can obtain a bright display and a good contrast ratio are included, it is possible to provide the projector 100 that displays a bright image with excellent contrast ratio.

The embodiment described above is merely intended to describe an embodiment of the invention, and can be arbitrarily modified and applied within the scope of the invention. As modification examples, for example, the following examples are considered.

Modification Example 1

The microlens array substrates 10 and 10A according to the above-described embodiments have a configuration in which the optical refractive index of the optical path length adjustment layer 14 is higher than the optical refractive index of the substrate 11, and is lower than the optical refractive index of the lens layers 13 and 15, but the invention is not limited to this form. The optical refractive index of the optical path length adjustment layer 14 may be the same as the optical refractive index of the lens layers 13 and 15. In other words, the configuration may be adopted, in which the lens layers 13 and 15 are formed to have a thickness including a layer thickness of the optical path length adjustment layer 14 and the optical path length adjustment layer 14 is not provided.

With this configuration, the lights L4 and L5 of inclined light that is incident on the flat portion 12a of the microlens ML are emitted from the microlens ML at the refraction angle θ2 as it is (optical path illustrated by a dashed line in FIG. 5) at the time of being refracted at the interface between the substrate 11 and the lens layers 13 and 15. In addition, the inclined light is not reflected at the interface between the lens layers 13 and 15 and the optical path length adjustment layer 14. Accordingly, it is possible to further increase utilization efficiency of light. However, since a single layer is thickly formed, warpage or deflection of the lens layer 13 and 15 to be formed can occur. In this case, it is preferable that the lens layers 13 and 15 and the optical path length adjustment layer 14 are individually formed, in the same manner as in the above-described embodiments.

Modification Example 2

In the microlens array substrates 10 and 10A according to the above-described embodiments, the plane shape of the flat portion 12a of the concave portion 12 is a circular shape, but the invention is not limited to this form. For example, the plane shape of the flat portion 12a of the concave portion 12 may be an approximately rectangular shape. If the plane shape of the flat portion 12a is an approximately rectangular shape, when the outline of the opening T of the pixel P is an approximately rectangular shape, the flat portion 12a can be disposed according to the outline of the opening T, and thus it is possible to increase an area in which parallel light incident on the microlens ML travels in a straight line as it is. When the plane shape of the flat portion 12a is an approximately rectangular shape, a plane shape of the opening 72 may be a rectangle, in the step of forming the opening 72 in the mask layer 71 illustrated in FIG. 6C.

Modification Example 3

The microlens array substrates 10 and 10A according to the above-described embodiments respectively have a configuration in which the inclined surface 12c of a tapered shape is included in the periphery of the curved surface portion 12b of the concave portion 12, but the invention is not limited to this form. For example, the microlens array substrates 10 and 10A may respectively have a configuration in which the concave portion 12 does not have the inclined surface 12c, and the curved surface portion 12b is formed from the periphery of the flat portion 12a to the rim portion. Also, in this configuration, if the central portion of the concave portion 12 has the flat portion 12a, and the optical refractive index of the optical path length adjustment layer 14 is higher than the optical refractive index of the substrate 11 and lower than the optical refractive index of the lens layers 13 and 15, it is possible to increase utilization efficiency of light and a contrast ratio. However, if the rim portion of the concave portion 12 is a curved surface, the incident light may be greatly refracted and totally reflected, and thus it is preferable that the concave portion 12 is configured to have the inclined surface 12c.

Modification Example 4

The fabricating method of the microlens array substrates 10 and 10A according to the above-described embodiments provides a configuration in which since the shape of the opening 72 of the mask layer 71, and the control film 70 are provided, a difference of etching rate between a width direction and a depth direction is controlled in a step of performing isotropic etching, and thereby the concave portion 12 is formed, but the invention is not limited to this form. For example, a resist layer is formed on the substrate 11, a shape which becomes a base of the concave portion 12 is formed on the resist layer using an exposure using a gray scale mask, a multi-stage exposure, or the like, anisotropic etching is performed in the lens layer and the substrate 11 using approximately the same etching selection ratio, and thereby it is possible to form the concave portion 12 in the substrate 11 by transferring the shape of the concave portion 12. In this case, the control film 70 is not required.

Modification Example 5

In the liquid crystal device 1 and 1A described above, the microlens array substrates 10 and 10A are included in the counter substrate 30, but the invention is not limited to this form. For example, the microlens array substrate 10 may be configured to be included in the element substrate 20.

Modification Example 6

An electronic apparatus to which the liquid crystal 1 according to the above-described embodiments is applicable is not limited to the projector 100. The liquid crystal device 1 can be appropriately used as, for example, a projection type head-up display (HUD), a direct-view type head mounted display (HMD), an electronic book, a personal computer, a digital still camera, a liquid crystal television, a view finder type or monitor direct view type video recorder, a car navigation system, an electronic notebook, or a display unit of an information terminal apparatus such as a POS.

The entire disclosure of Japanese Patent Application No. 2014-138393, filed Jul. 4, 2014 is expressly incorporated by reference herein.

What is claimed is:
1. A microlens array substrate comprising:
a substrate;
a lens layer that is disposed on the substrate; and
a light passing-through layer that covers the lens layer,
wherein the lens layer includes a concave portion having a flat portion, a curved surface portion positioned outside of the flat portion, and an inclined surface portion positioned outside of the curved surface portion,
wherein the inclined surface portion is inclined with respect to a normal direction to a surface of the substrate, and
wherein a refractive index of the lens layer is higher than a refractive index of the substrate, and a refractive index of the light passing-through layer is higher than a refractive index of the substrate and is equal to or lower than a refractive index of the lens layer.
2. The microlens array substrate according to claim 1, wherein the refractive index of the light passing-through layer is lower than the refractive index of the lens layer.

3. An electro-optical device comprising:
a first substrate;
a second substrate that is disposed so as to face the first substrate;
an electro-optical layer that is disposed between the first substrate and the second substrate; and
a light blocking portion that is configured by a plurality of light blocking layers which is disposed in the first substrate, and has an opening corresponding to a pixel,
wherein the first substrate or the second substrate includes the microlens array substrate according to claim 2, and
wherein an inner edge of the light blocking portion is disposed further outside than an outer edge of the flat portion, in a planar view.

4. The electro-optical device according to claim 3,
wherein the pixel has an approximately rectangular shape in a planar view, and
wherein the lens layer is continuously provided in a direction of a diagonal line that connects opposite corners of the pixel to each other.

5. An electronic apparatus comprising the electro-optical device according to claim 4.

6. An electronic apparatus comprising the electro-optical device according to claim 3.

7. An electro-optical device comprising:
a first substrate;
a second substrate that is disposed so as to face the first substrate;
an electro-optical layer that is disposed between the first substrate and the second substrate; and
a light blocking portion that is configured by a plurality of light blocking layers which is disposed in the first substrate, and has an opening corresponding to a pixel,
wherein the first substrate or the second substrate includes the microlens array substrate according to claim 1, and
wherein an inner edge of the light blocking portion is disposed further outside than an outer edge of the flat portion, in a planar view.

8. The electro-optical device according to claim 7,
wherein the pixel has an approximately rectangular shape in a planar view, and
wherein the lens layer is continuously provided in a direction of a diagonal line that connects opposite corners of the pixel to each other.

9. An electronic apparatus comprising the electro-optical device according to claim 8.

10. An electronic apparatus comprising the electro-optical device according to claim 7.

\* \* \* \* \*